United States Patent
Nomura et al.

(10) Patent No.: US 8,424,626 B2
(45) Date of Patent: Apr. 23, 2013

(54) VEHICLE

(75) Inventors: Akifumi Nomura, Saitama (JP); Kazuyuki Nakai, Saitama (JP); Kenichi Ohmori, Saitama (JP); Yoshiaki Tsukada, Saitama (JP); Takashi Tsutsumizaki, Saitama (JP); Shinichi Wagatsuma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 388 days.

(21) Appl. No.: 12/729,513

(22) Filed: Mar. 23, 2010

(65) Prior Publication Data

US 2010/0243349 A1    Sep. 30, 2010

(30) Foreign Application Priority Data

Mar. 31, 2009 (JP) ................... 2009-087779
Mar. 31, 2009 (JP) ................... 2009-088260
Feb. 3, 2010 (JP) ................... 2010-022234

(51) Int. Cl.
*B60K 1/00* (2006.01)

(52) U.S. Cl.
USPC .................... 180/65.31; 180/65.265

(58) Field of Classification Search ............... 180/65.31, 180/65.26, 65.21, 65.25, 220, 291, 65.265; 477/3, 5, 6; 123/336, 399, 192.2, 574
See application file for complete search history.

(56) References Cited

U.S. PATENT DOCUMENTS

| | | | |
|---|---|---|---|
| 6,155,366 A * | 12/2000 | Lin | 180/65.25 |
| 6,281,646 B1 * | 8/2001 | Masberg et al. | 180/65.21 |
| 6,488,608 B2 * | 12/2002 | Yamaguchi et al. | 477/3 |
| 6,878,093 B2 * | 4/2005 | Fukushima et al. | 477/3 |
| 6,960,152 B2 * | 11/2005 | Aoki et al. | 477/3 |
| 7,353,895 B2 * | 4/2008 | Bitsche et al. | 180/65.25 |
| 7,669,573 B2 * | 3/2010 | Ogasawara et al. | 123/192.2 |
| 7,743,758 B2 * | 6/2010 | Keyaki et al. | 123/574 |
| 7,819,211 B2 * | 10/2010 | Fukami et al. | 180/65.26 |
| 7,874,279 B2 * | 1/2011 | Fukami et al. | 123/399 |
| 8,051,832 B2 * | 11/2011 | Hotta et al. | 123/399 |
| 8,113,168 B2 * | 2/2012 | Yamada | 123/336 |
| 8,160,790 B2 * | 4/2012 | Oshima et al. | 701/62 |

FOREIGN PATENT DOCUMENTS

| | | |
|---|---|---|
| EP | 1839925 A2 | 10/2007 |
| JP | 2002-295223 | 10/2001 |
| JP | 2006-044495 | 2/2006 |

* cited by examiner

*Primary Examiner* — Hau Phan

(74) *Attorney, Agent, or Firm* — Birch, Stewart, Kolasch & Birch, LLP

(57) ABSTRACT

A technique for enabling reduction of fuel consumption without greatly changing an engine structure and without impairing a feeling of operation of a vehicle as a motorcycle. An engine includes a crankshaft and a primary gear integrated with the crankshaft that is attached such that the power of the engine is transmitted to a wheel. A one-way clutch transmits the power from the crankshaft to the primary gear but does not transmit the power from the primary gear to the crankshaft. The one-way clutch is provided between the crankshaft and the primary gear with a regenerative brake motor being provided on the primary gear. The engine is non-swingable mounted on the vehicle body with a cylinder extending in a substantially horizontal direction and a crankshaft provided to be oriented in a vehicle width direction. An electric motor is located in front of and above the crankshaft of the engine.

17 Claims, 27 Drawing Sheets

NORMAL RUNNING MODE

ENGINE BRAKE MODE

VEHICLE

CROSS-REFERENCE TO RELATED APPLICATIONS

The present application claims priority under 35 USC 119 to Japanese Patent Application No. 2009-088260 filed on Mar. 31, 2009; Japanese Patent Application No. 2009-087779 filed on Mar. 31, 2009 and Japanese Patent Application No. 2010-022234 filed on Feb. 3, 2010 the entire contents of which are hereby incorporated by reference.

BACKGROUND OF THE INVENTION

1. Field of the Invention

The present invention relates to improvement in a vehicle having an engine as a driving source and to a hybrid vehicle having two drive sources, i.e., an internal combustion engine and an electric motor.

2. Description of Background Art

An engine mounted on a vehicle is widely known. See, for example, JP-A No. 2002-295223, FIG. 3.

In FIG. 3 of JP-A No. 2002-295223, an engine as a power unit 1 (reference numerals from the publication are used hereinbelow) is provided with a crankshaft 9, a primary driven gear 12 attached to the crankshaft 9, a clutch mechanism 11 attached to the primary driven gear 12, a main shaft 13 attached to the clutch mechanism 11, a counter shaft 15 attached to the main shaft 13 via a main gear array 14 and a counter gear array 16, and an output sprocket 17 attached to the counter shaft 15.

The power of the crankshaft 9 is transmitted to the primary driven gear 12, the clutch mechanism 11, the main shaft 13, the main gear array 14, the counter gear array 16 and the counter shaft 15, and is outputted from the output sprocket 17.

In the meantime, as a means for applying a brake to a vehicle, a brake means and an engine brake are known. The engine brake, which utilizes a mechanical loss of the engine, reduces the number of revolutions of the engine and brakes a wheel utilizing a difference between the wheel and the revolution speed of the engine.

In the technique of JP-A No. 2002-295223, a case where the engine acts as an engine brake will be studied hereinbelow.

To brake a wheel, when a throttle valve is closed, the revolution speed of the engine is reduced, and the torque of the wheel is applied to the counter shaft 15. The torque of the wheel is transmitted to the counter gear array 16, the main gear array 14, the main shaft 13, the clutch mechanism 11, the primary driven gear 12 and the crankshaft 9, in this order. At this time, a braking force is applied to the wheel by a mechanical loss of the engine.

In the meantime, in recent years, a problem occurs with respect to the reduction in the fuel consumption. In an engine having a fuel injection system, when the engine acts as an engine brake, the fuel consumption is reduced by cutting the fuel. A technique for a further reduction of fuel consumption is preferable.

A power unit for a hybrid vehicle to be installed in a motorcycle is known as disclosed in JP-A No. 2006-044495.

According to the power unit for a hybrid vehicle as disclosed in JP-A No. 2006-044495, power from an internal combustion engine is transmitted to a rear wheel through a belt continuously variable transmission and a gear transmission constituting a power transmission mechanism. In addition, power from an electric motor is transmitted to the rear wheel through the gear transmission. The electric motor is disposed coaxially with a driven pulley constituting the continuously variable transmission, and is located lateral to the rear wheel.

However, according to this power unit, the electric motor is located rearwardly of and below a crankshaft of the internal combustion engine, and outwardly in the width direction of the driven pulley constituting the continuously variable transmission. The electric motor, disposed lateral to the rear wheel, has led to an increased lateral expansion. Also, the electric motor is heavy, and therefore, is preferably disposed in the vicinity of the center of a vehicle body.

SUMMARY AND OBJECTS OF THE INVENTION

The present invention has a problem with respect to provide a technique for enabling a reduction in the fuel consumption without greatly changing the engine structure and without impairing a feeling of the operation of the vehicle as a motorcycle.

According to an embodiment of the present invention, a vehicle is provided that includes a vehicle body frame supporting a crankshaft, a primary gear integrated with the crankshaft, a primary driven gear engaged with the primary gear, a clutch mechanism coupled with the primary driven gear that connects/disconnects power of the engine, and a transmission provided on the output side of the clutch mechanism, and to which the engine that transmits the power to a drive shaft via the transmission is attached. A one-way clutch is provided that transmits the power from the crankshaft to the primary gear but does not transmit the power from the primary gear to the crankshaft. The one-way clutch is provided between the crankshaft and the primary gear. A regenerative brake motor, that enables braking of the wheel and enables conversion of torque of the wheel to electric energy, is provided between the primary gear and a drive shaft of the wheel.

According to an embodiment of the present invention, the crankshaft is provided with a power transmission mechanism that drives an oil pump upstream of the one-way clutch.

According to an embodiment of the present invention, the regenerative brake motor is provided so as to be engaged with the primary gear.

According to an embodiment of the present invention, the regenerative brake motor is coupled with the wheel.

According to an embodiment of the present invention, the vehicle includes a controller that causes the regenerative brake motor to generate electric energy when a revolution speed of the primary gear is high in a revolution ratio between the crankshaft and the primary gear, while causing the regenerative brake motor to run idle when a revolution speed of the crankshaft is equal to or higher than the revolution ratio of the revolution speed of the primary gear.

According to an embodiment of the present invention, a connection/disconnection mechanism for disconnection when a throttle valve is opened and for connection when the throttle valve is closed is provided between the primary gear and the regenerative brake motor.

According to an embodiment of the present invention, a rotor of the regenerative brake motor is provided coaxially with the primary gear and the one-way clutch.

According to an embodiment of the present invention, a throttle wire actuator unit is provided that opens/closes the throttle.

According to an embodiment of the present invention, a regenerative brake motor that enables braking of a wheel and enables conversion of torque of the wheel to electric energy is provided between the primary gear and the drive shaft of the wheel.

When a brake is applied to a wheel during operation of the vehicle such as operating the vehicle on a downward slope, a brake is used. In addition to the brake, a so-called engine brake to reduce the number of revolutions of the engine and transmit the torque applied to the wheel to the engine, and brake the wheel on the driving side coupled with the engine, is widely used.

In this case, according to an embodiment of the present invention, a one-way clutch is provided between the crankshaft and the primary gear, so as to block and not to transmit the torque of the primary gear to the crankshaft of the engine. Further, the regenerative brake motor engaged with the primary gear is controlled to act so as to absorb energy related to the torque of the wheel.

As the regenerative brake motor absorbs the energy related to the torque of the wheel when the revolution speed of the wheel is raised, a braking force corresponding to the engine brake can be applied to the wheel. At this time, as the torque of the primary gear is not transmitted to the crankshaft, the number of revolutions of the engine is not raised when the number of revolutions of the wheel is raised. As the number of revolutions of the engine is not raised, the fuel consumption in the engine can be reduced. In addition, as the energy by the torque of the wheel is converted to electric energy, the energy can be effectively utilized.

According to an embodiment of the present invention, a power transmission mechanism that drives an oil pump upstream of the one-way clutch is provided. As the power transmission mechanism is provided on the upstream side from the one-way clutch, it reliably performs engine lubrication without being influenced by the revolution speed of the wheel.

According to an embodiment of the present invention, the regenerative brake motor is provided so as to be engaged with the primary gear. That is, the regenerative brake motor is provided in the engine. As the regenerative brake motor is provided in the vicinity of the crankshaft of the engine, the fuel consumption can be reduced without greatly changing the structure of the engine and without impairing the feeling of the operation of the vehicle as a motorcycle.

According to an embodiment of the present invention, as the regenerative brake motor is coupled with the wheel and can be used as a drive motor to drive the wheel, the regenerative brake motor can be effectively utilized as a motor for wheel driving.

According to an embodiment of the present invention, the vehicle includes a controller that causes the regenerative brake motor to run idle when the revolution speed of the crankshaft is equal to or higher than the revolution ratio (gear ratio) of the revolution speed of the primary gear. When it is not necessary to apply an engine brake to the vehicle, the regenerative brake motor is caused to run idle, accordingly, the fuel consumption of the engine can be further reduced.

According to an embodiment of the present invention, as a connection/disconnection mechanism for disconnection when a throttle valve is opened and for connection when the throttle valve is closed is provided, co-rotation of the motor can be prevented, and the fuel consumption can be further improved.

According to an embodiment of the present invention, as the rotor of the regenerative brake motor is provided coaxially with the primary gear and the one-way clutch, expansion of the size of the engine can be suppressed.

According to an embodiment of the present invention, as a throttle wire actuator unit that opens/closes the throttle is provided, when the throttle is opened again, the rotation of the crankshaft can be smoothly connected in correspondence with the number of revolutions of the transmission without the occurrence of a shock.

Accordingly, an object of an embodiment of the present invention is to provide a hybrid vehicle in which an electric motor is disposed in the vicinity of the center of a vehicle body to reduce lateral expansion.

In order to accomplish the above-mentioned object, according to an embodiment of the present invention, a hybrid vehicle includes an internal combustion engine, an electric motor and a power transmission mechanism for transmitting power of the internal combustion engine and the electric motor to a driven portion. The internal combustion engine is suspended on a vehicle body in a non-swingable manner, with a cylinder extending in a substantially horizontal direction and a crankshaft provided to be oriented in a vehicle width direction. The electric motor is located in front of and above the crankshaft of the internal combustion engine.

According to an embodiment of the present invention, on one end of the crankshaft of the internal combustion engine, there is provided a variable speed mechanism for shifting power from the internal combustion engine to transmit the shifted power to the power transmission mechanism.

According to an embodiment of the present invention, the electric motor and the variable speed mechanism are provided in a one-sided manner in the vehicle width direction with respect to the internal combustion engine.

According to an embodiment of the present invention, the electric motor is disposed lateral to a cylinder block constituting the cylinder and in an overlapping manner with the cylinder block in a side view.

According to an embodiment of the present invention, the power transmission mechanism is provided with a variable speed portion for shifting power from the internal combustion engine and the electric motor to transmit the shifted power to the driven portion.

According to an embodiment of the present invention, power of the internal combustion engine is input, by the variable speed mechanism, into a primary drive gear provided on the crankshaft through a first one-way clutch to be transmitted from the primary drive gear to the power transmission mechanism.

According to an embodiment of the present invention, the primary drive gear is provided with a driven gear to engage with a motor drive gear of the electric motor, wherein power from the electric motor is input into the driven gear to be transmitted from the primary drive gear to the power transmission mechanism.

According to an embodiment of the present invention, the driven gear and a motor case overlap with each other in side view.

According to an embodiment of the present invention, a starter motor is provided for starting the internal combustion engine wherein the starter motor is disposed above the crankcase and in an overlapping manner with the electric motor in side view.

According to an embodiment of the present invention, a throttle mechanism using a throttle-by-wire system for operating the internal combustion engine is provided wherein the throttle mechanism is disposed above the cylinder and in an overlapping manner with the electric motor in a side view.

According to an embodiment of the present invention, an actuator of the throttle mechanism is located opposite to the electric motor in the width direction with respect to a vehicle center line.

According to an embodiment of the present invention, a vehicle center line is located between a center of a piston of the internal combustion engine, and the electric motor.

According to an embodiment of the present invention, a cover member for covering the electric motor is provided with a cooling opening for cooling the electric motor.

According to an embodiment of the present invention, a power unit composed of the internal combustion engine, the electric motor, and the power transmission mechanism, is suspended by a main frame extending rearward and downward from a head pipe, and an air cleaner is fixed to the main frame. The air cleaner is connected to the engine through an intake passage extending above and in front of the engine, and a leg shield is provided on either side of a head portion of the cylinder. In addition, the electric motor is disposed rearwardly of the intake passage, between the cylinder and the main frame.

According to an embodiment of the present invention, the variable speed mechanism is a double centrifugal clutch provided on the crankshaft. Also, a first-stage centrifugal clutch is configured in such a manner that, when rotational speed of a first clutch inner reaches a first predetermined rotational speed, the first clutch inner is connected to a clutch outer. The clutch outer forms a ring gear of a planetary gear mechanism provided on the crankshaft. Planetary gears engage with the ring gear engage with a sun gear rotatable in one direction and are prevented from rotating in the other direction. Connection of the first clutch inner to the clutch outer results in power transmission to the planetary gears to allow the sun gear to rotate in the other direction, so that rotation of the clutch outer is decelerated through carriers for supporting the planetary gears to be transmitted to the power transmission mechanism.

Furthermore, a second-stage centrifugal clutch is configured in such a manner that, when rotational speed of a second clutch inner rotated integrally with the carriers reaches a second predetermined rotational speed, the second clutch inner is connected to the clutch outer. Connection of the second clutch inner to the clutch outer allows the ring gear, the carriers, and the sun gear to rotate integrally in one direction, so that rotation of the clutch outer is transmitted to the power transmission mechanism, without decelerating through the planetary gear mechanism.

According to an embodiment of the present invention, the carriers are supported by an outer circumferential cylinder provided on an outer circumference of the crankshaft in such a manner so as to be rotatable relative to the crankshaft. The outer circumferential cylinder is connected to the primary drive gear through the first one-way clutch. Also, the first clutch inner and the second clutch inner are connected through a second one-way clutch. The second one-way clutch is provided to prevent the second clutch inner from rotating in one direction with respect to the first clutch inner and allow the second clutch inner to rotate in the other direction.

According to an embodiment of the present invention, the electric motor is located in front of and above the crankshaft of the internal combustion engine. This prevents the electric motor from interfering with the rear wheel, and the electric motor can be disposed in the vicinity of the center of the vehicle body, thereby allowing a reduction of lateral expansion.

According to an embodiment of the present invention, on one end of the crankshaft of the internal combustion engine, there is provided a variable speed mechanism for shifting power from the internal combustion engine to transmit the shifted power to the power transmission mechanism. Thus, power of the internal combustion engine can be previously shifted by the variable speed mechanism to be transmitted to the power transmission mechanism.

According to an embodiment of the present invention, the electric motor and the variable speed mechanism are provided in a one-sided manner in the vehicle width direction with respect to the internal combustion engine, thereby allowing effective utilization of a space lateral to the internal combustion engine.

According to an embodiment of the present invention, the electric motor is disposed laterally to the cylinder block constituting the cylinder and in an overlapping manner with the cylinder block in side view. Therefore it is possible to reduce the vertical length of the power unit and miniaturize the power unit.

According to an embodiment of the present invention, the power transmission mechanism is provided with a variable speed portion for shifting power from the internal combustion engine and the electric motor to transmit the shifted power to the driven portion. Thus, power of the internal combustion engine and the electric motor can be shifted by the variable speed portion and then transmitted to the driven portion.

According to an embodiment of the present invention, power of the internal combustion engine is input, by the variable speed mechanism, into the primary drive gear provided on the crankshaft through the first one-way clutch to be transmitted from the primary drive gear to the power transmission mechanism, thereby allowing travel of the vehicle using the power of the internal combustion engine.

According to an embodiment of the present invention, the driven gear to engage with the motor drive gear of the electric motor is provided on the primary drive gear in an integrally rotated manner with the primary drive gear, and power from the electric motor is transmitted from the primary drive gear to the power transmission mechanism, thereby allowing travel of the vehicle using the power of the electric motor. In addition, by disengaging the one-way clutch, transmission of power of the electric motor to the crankshaft is prevented. Therefore, co-rotation of the internal combustion engine during the EV running is prevented, so that fuel economy can be increased.

According to an embodiment of the present invention, the driven gear and the motor case overlap with each other in a side view. With this structure, power of the electric motor can be also decelerated by engagement between the drive gear and the driven gear of the electric motor. Also, the electric motor and the variable speed mechanism can be closely disposed.

According to an embodiment of the present invention, the starter motor is disposed above the crankcase and in an overlapping manner with the electric motor in side view, thereby allowing miniaturization of the power unit.

According to an embodiment of the present invention, the throttle mechanism is disposed above the cylinder and in an overlapping manner with the electric motor in a side view, thereby allowing miniaturization of the power unit.

According to an embodiment of the present invention, the actuator of the throttle mechanism is located opposite to the electric motor in the width direction with respect to the vehicle center line. Therefore, the expansion of the actuator allows preventing interference with the electric motor.

According to an embodiment of the present invention, the vehicle center line is located between the center of the piston of the internal combustion engine, and the electric motor. This allows a reduction of lateral expansion and an improvement of a deviation from the center of gravity of the motorcycle.

According to an embodiment of the present invention, the cover member for covering the electric motor is provided with cooling openings for cooling the electric motor, thereby suppressing heat generation of the electric motor.

According to an embodiment of the present invention, the electric motor is disposed rearwardly of the intake passage, between the cylinder and the main frame, thereby allowing miniaturization of the power unit.

According to an embodiment of the present invention, the variable speed mechanism is a double centrifugal clutch provided on the crankshaft. Also, the first-stage centrifugal clutch decelerates rotation of the clutch outer through the planetary gear mechanism to transmit the rotation to the power transmission mechanism. Furthermore, the second-stage centrifugal clutch transmits rotation of the clutch outer to the power transmission mechanism without decelerating the rotation through the planetary gear mechanism. This structure allows automatic gear shifting according to a rotational speed during operation of the engine.

According to an embodiment of the present invention, the first clutch inner and the second clutch inner are connected through the second one-way clutch. The second one-way clutch is provided to prevent the second clutch inner from rotating in one direction with respect to the first clutch inner and allow the second clutch inner to rotate in the other direction. With this structure, it is possible to reliably prevent rotational noises of the ratchets during operation of the motor. In addition, a miniaturization of energy losses caused by co-rotation of the outer circumferential cylinder with the rotation of the primary drive gear.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, embodiments of the present invention will be described in detail. In the figures and examples, "up," "down," "front," "rear," "left" and "right" respectively indicate a direction viewed from a driver riding a motorcycle. Note that the drawings are to be viewed along the direction of the reference signs.

Figure 1:
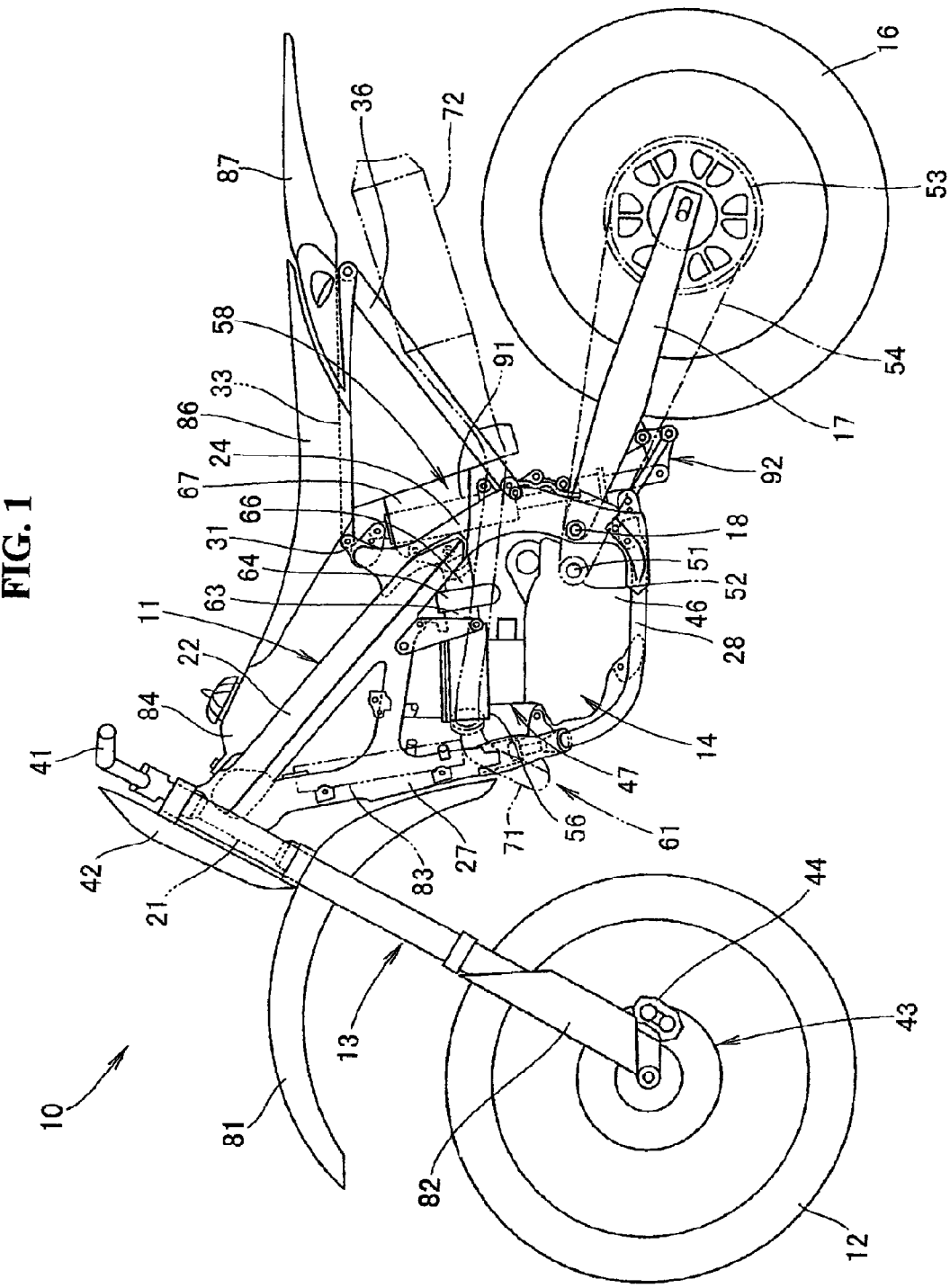
FIG. 1 is a left side view of a motorcycle according to the present invention.

FIG. 1 is a side view of a vehicle according to the present invention. A motorcycle 10 as a vehicle is a vehicle where, a front fork 13 is provided to support a front wheel 12 that is steerably attached to a front end of a vehicle body frame 11. An engine 14 is provided in a central part of the vehicle body frame 11. A rear fork 17 for supporting a rear wheel 16 is upwardly/downwardly swingably attached via a pivot shaft 18 to a lower rear part of the vehicle body frame 11.

The vehicle body frame 11 has a head pipe 21 which is provided at a front end and to which the front fork 13 is rotatably attached, a pair of left and right main frames 22 and 23 (only the front side reference sign 22 is shown) extend diagonally downward behind the head pipe 21 with a pair of left and right pivot plates 24 and 26 (only the front side reference sign 24 is shown) extending downward from the respective rear ends of these main frames 22 and 23. A down frame 27 extends downwardly from the head pipe 21 with a pair of left and right lower frames 28 and 29 (only the front side reference sign 28 is shown) connecting these down frame 27 to the left and right pivot plates 24 and 26. A pair of left and right seat rails 33 and 34 (only the front side reference sign 33 is shown) extend rearwardly from upper brackets 31 and 32 (only the front side reference sign 31 is shown) and are attached to the respective upper ends of the pivot plates 24 and 26. A pair of left and right sub frames 36 and 37 (only the front side reference sign 36 is shown) are attached to the respective rear ends of these seat rails 33 and 34 and intermediate parts of the pivot plates 24 and 26.

In the front fork 13, a bar handle 41 is attached to an upper part, a number plate 42 is attached to a front part, and a brake caliper 44 of a disk brake 43 is attached to a lower part.

In the engine 14, a transmission 46 is integrally provided in a rear part, a cylinder 47 extending upward is provided in a front part, and the engine is attached to the vehicle body frame 11.

In the transmission 46, a drive shaft 51 is provided in a side part, a drive sprocket 52 is attached to the drive shaft 51, and a chain 54 is put, together with a driven sprocket 53 integrally provided with the rear wheel 16, around the drive sprocket 52.

With the above-described structure, the power of the engine 14 is transmitted via the drive shaft 51 and the chain 54 to the rear wheel 16 as as a wheel.

The cylinder 47 has a cylinder head 56. In the cylinder head 56, an intake system 58 is connected to a rear part, and an exhaust system 61 is connected to a front part.

The intake system 58 has an intake pipe 63 connected to the cylinder head 56, a throttle body 64 connected to the intake pipe 63, and an air cleaner 67 connected via a connecting tube 66 to the throttle body 64.

The exhaust system 61 has an exhaust pipe 71 with its end connected to the cylinder head 56 and a muffler 72 connected to the other end of the exhaust pipe 71.

A throttle wire actuator unit (throttle by wire not shown) to open/close a throttle may be provided in the vicinity of the throttle body 64.

In the engine 14, in a case where the throttle by wire to open/close a throttle is provided in the vicinity of the throttle body 64, when the throttle is opened again, the rotation of the crankshaft can be smoothly connected in correspondence with the number of revolutions of the transmission without the occurrence of a shock.

A front fender 81 is provided together with a protector 82 for covering a lower front part of the front fork 13, a radiator 83, a fuel tank 84, a driver's seat 86, a rear fender 87 and a rear shock absorber 91 with its upper end coupled with the side of the upper brackets 31 and 32 and its lower end coupled with the side of the rear fork 17 and the pivot plates 24 and 26 via a link mechanism 92.

Figure 2:
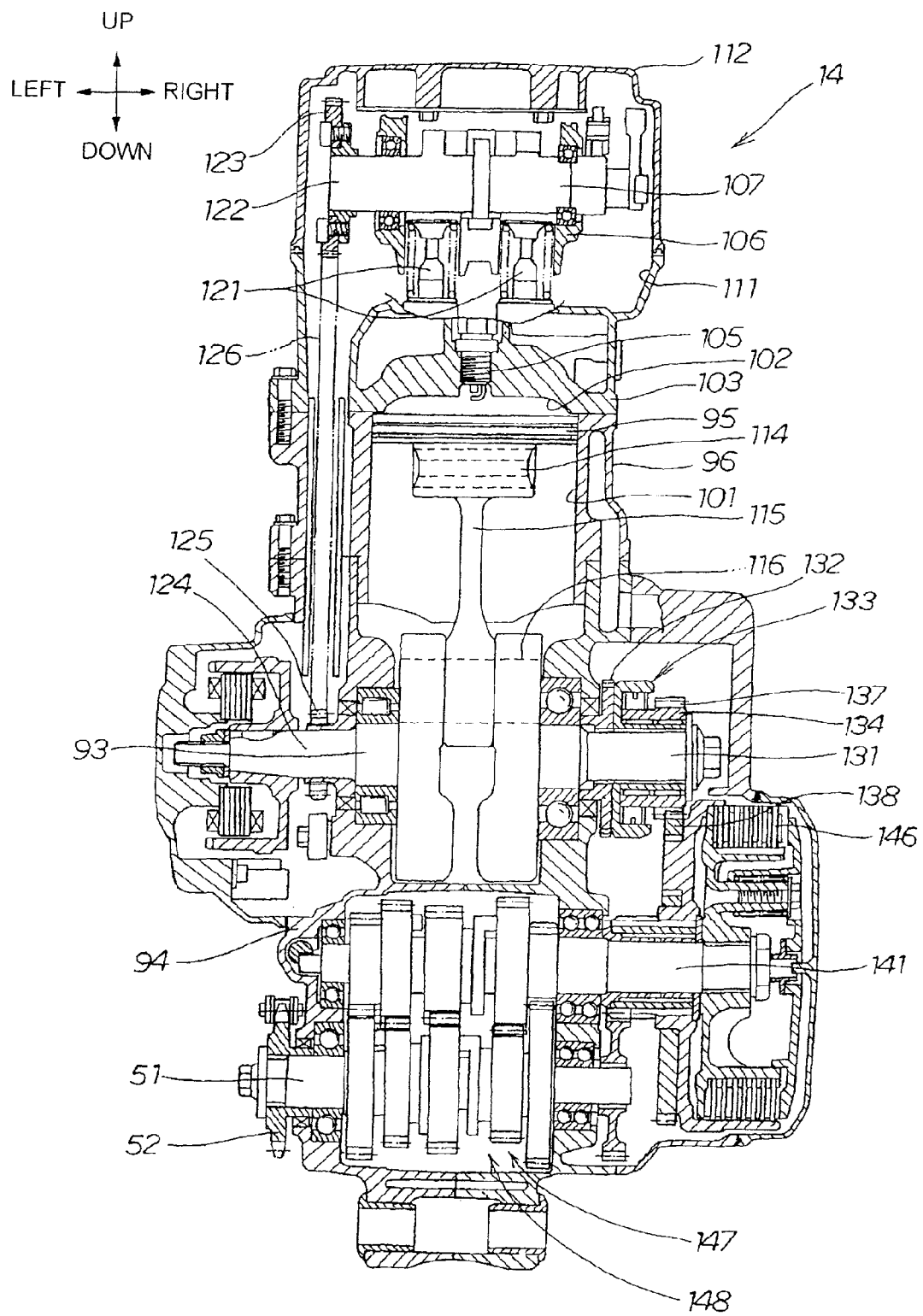
FIG. 2 is a principal part cross-sectional view of an engine according to the present invention.

In FIG. 2, the engine 14 has a crankcase 94 accommodating the crankshaft 93, a cylinder 96 extending upwardly from the crankcase 94 and in which a piston 95 is slidably provided, a cylinder head 103 attached so as to cover the upper part of the cylinder 96, an ignition plug 105 attached to the cylinder head 103 so as to face a combustion chamber 102, a camshaft 107 attached via a camshaft holder 106 to the cylinder head 103, and a head cover 112 covering the upper part of the cylinder head 103.

The combustion chamber 102 is formed in a region surrounded by the piston 95 and the cylinder 101, and a valve chamber 111 is formed in a region surrounded by the cylinder head 103 and the head cover 112.

The piston 95 provided in the cylinder 101 is coupled with the crankshaft 93 via a piston pin 114, a connecting rod 115 and a crankpin 116.

A cam sprocket 123 is fixed to an end 122 of the camshaft to drive an intake/exhaust valve 121, a cam drive sprocket 125 is fixed to an end 124 of the crankshaft, and a cam chain 126 is put around between the cam drive sprocket 125 and the cam sprocket 123 such that the power of the crankshaft 93 is transmitted to the camshaft 107.

Hereinbelow, also referring to FIG. 5, a structure from the crankshaft 93 to the drive sprocket 52 fixed to the drive shaft 51 will be described.

A balancer drive gear 132 to drive a balancer shaft to be described later and a one-way clutch 133 are attached to another end 131 of the crankshaft, a primary gear 137 is attached to an outer wheel 134 of the one-clutch, and a primary driven gear 138 engaged with the primary gear 137 is provided coaxially with a main shaft 141 provided below the crankshaft 93. The primary gear 137 is also engaged with a motor gear 144 fixed to a motor shaft 143 extending from a regenerative brake motor 142.

The regenerative brake motor 142 enables braking of the rear wheel as a wheel (reference sign 16 in FIG. 1) and enables conversion of the torque of the rear wheel 16 to electric energy.

A clutch mechanism 146 to disconnect/connect the power of the engine 14 is coupled with the primary driven gear 138, the main shaft 141 is attached to the output side of the clutch mechanism 146, a transmission 148 having a transmission gear array 147 to change the revolution speed of the drive shaft 51 is provided between the main shaft 141 and the drive shaft 51, and the drive shaft 51 as an output shaft is provided downstream of the transmission 148.

The primary gear 137 attached to the one-way clutch 133 is engaged with the motor gear 144 fixed to the motor shaft 143 extending from the regenerative brake motor 142 and is also engaged with the primary driven gear 138.

The regenerative brake motor 142 is provided so as to be engaged with the primary gear 137. That is, the regenerative brake motor 142 is provided in the crankcase 94 of the engine 14. As the regenerative brake motor 142 is provided at the other end 131 of the crankshaft of the engine 14, fuel consumption can be reduced without greatly changing the structure of the engine 14 and without impairing a feeling of the operation of the vehicle as a motorcycle. Thus, the vehicle mass centralization can easily be achieved.

Note that in the present example, the regenerative brake motor is provided so as to be always engaged with the primary gear. However, there is no problem when the regenerative brake motor is provided between the primary gear and the rear wheel shaft as a wheel drive shaft.

Figure 3:
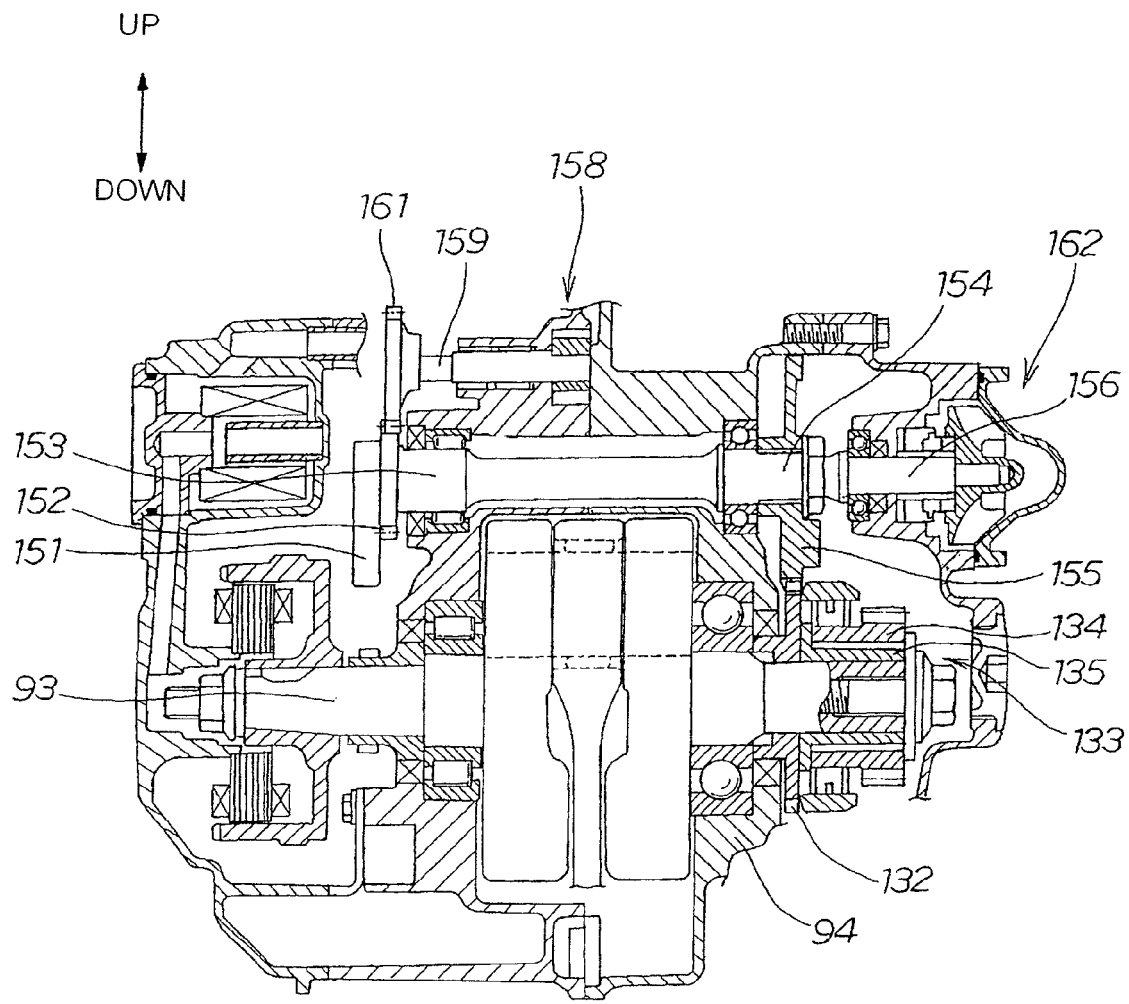
FIG. 3 is a cross-sectional view explaining a balancer shaft of the engine according to the present invention and its peripheral portion.

In FIG. 3, in the crankcase 94, a balancer shaft 153 having a balance weight 151 at its end and an oil pump drive gear 152 as a constituent member of a power transmission mechanism is provided in parallel with the crankshaft 93, the balancer drive gear 132 is attached to the other end 154 of the balancer shaft, and a balancer driven gear 155 driven with the balancer drive gear 132 and a water pump shaft 156 fixed to the other end 154 of the balancer shaft are provided.

An oil pump driven gear 161 engaged with the oil pump drive gear 152 is fixed to a shaft member 159 extending from an oil pump 158.

With the above-described structure, when the balancer shaft 153 is rotated, the water pump 162 and the oil pump 158 can be rotated. In this manner, when a water-cooled engine is used, the water pump 162 is simultaneously driven in addition to the oil pump 158.

Also referring to FIG. 2, the balancer driven gear 155 fixed to the balancer shaft 153 is engaged with the balancer drive gear 132 fixed to the crankshaft 93, and the torque of the crankshaft 93 is transmitted to the balancer shaft 153. The power transmission mechanism to drive the oil pump 158 is constituted with the oil pump drive gear 152 provided on the balancer shaft 153.

The oil pump drive gear 152 is provided on the balancer shaft 153 of the engine 14, and the oil pump 158 is driven with the oil pump drive gear 152. As the oil pump drive gear 152 is provided on the side of the crankshaft 93 as the upstream side from the one-way clutch 133, it reliably performs lubrication and cooling of the engine 14 without being influenced by the revolution speed of the wheel.

Figure 4A:
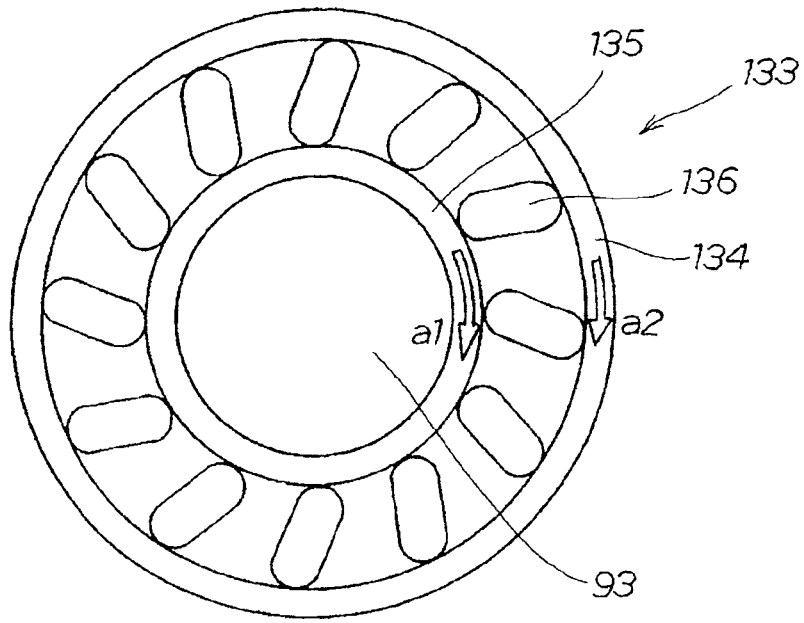
FIGS. 4(a) and 4(b) are principle diagrams of a one-way clutch provided in the engine according to the present invention.
Figure 4B:
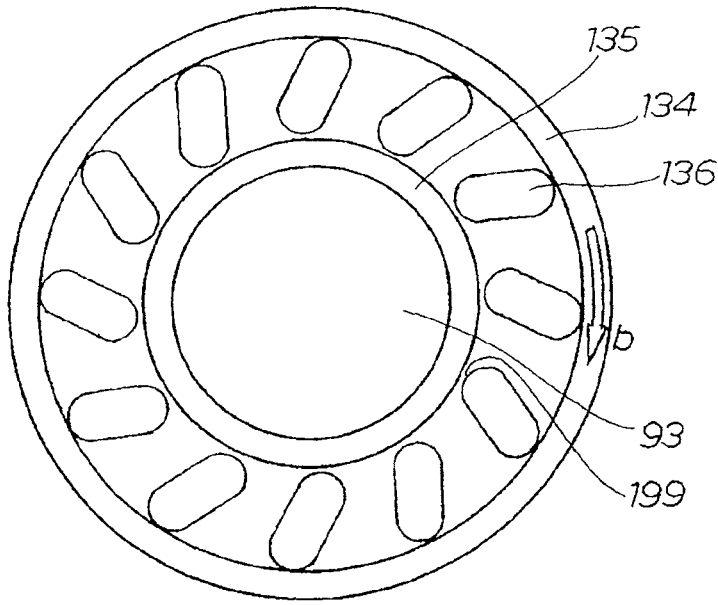

In FIG. 4, the one-way clutch 133 has an inner ring 135 attached to the crankshaft 93 of the engine with a plurality of cams 13 . . . (hereinafter " . . . " indicates "a plurality".) arranged so as to surround the inner ring 135. An outer ring 134 is arranged so as to surround these cams 136 . . . and to which the primary gear 137 is attached, as principal constituents. The cams 136 . . . are always in contact with the inner ring 135 and the outer ring 134.

FIG. 4(*a*) shows an arrangement of the cams 136 . . . when the vehicle is in a normal running mode. When power in an arrow a1 direction is applied to the inner ring 135, the cams 136 . . . are directed toward a normal direction of the inner ring 135, and act as support struts, to transmit the power in the direction of an arrow a2 to the outer ring 134. The inner ring 135 and the outer ring 134, integral with each other, are rotated.

FIG. 4(*b*) shows an arrangement of the cams 136 . . . when the vehicle is in an engine brake mode. When a driving force in a b direction is applied to the outer ring 134, as the cams 136 . . . are inclined in a tangent line direction of the inner ring 135, the power of the outer ring 134 is blocked, and the inner ring 135 is not rotated by the power of the outer ring 134.

In FIGS. 4(*a*) and 4(*b*), to clarify that the power is not transmitted from the outer ring 134 to the inner ring 135, clearances 199 . . . are formed between the inner ring 135 and the cams 136 . . . for the sake of convenience.

Referring to FIG. 2, the one-way clutch 133 provided between the crankshaft 93 and the primary gear 137 transmits the power from the crankshaft 93 to the primary gear 137 but does not transmit the power from the primary gear 137 to the crankshaft 93.

Figure 5:
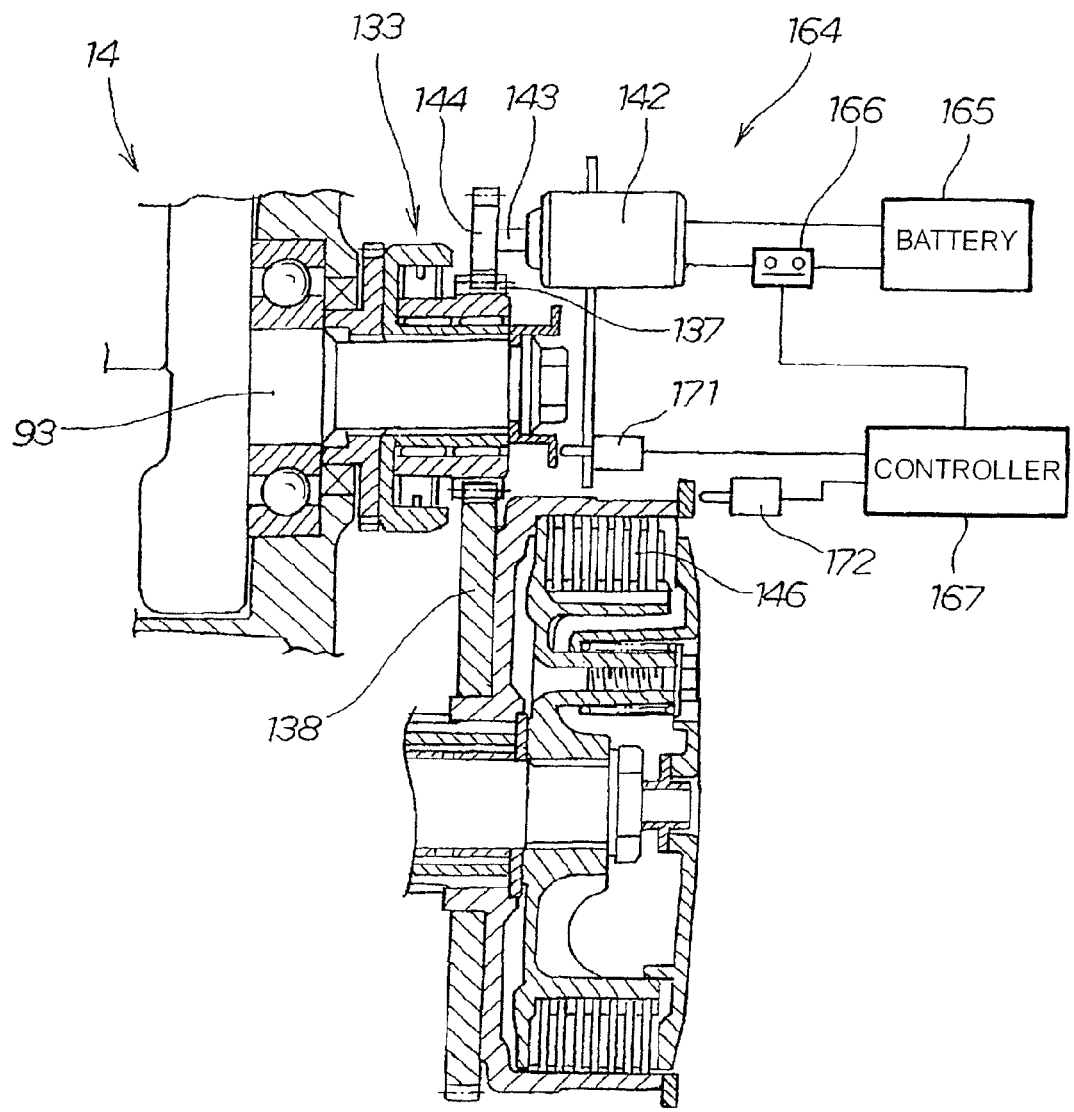
FIG. 5 illustrates the configuration of a regenerative brake motor system provided in the engine according to the present invention.

In FIG. 5, the regenerative brake motor system 164 has the regenerative brake motor 142 coupled via the motor gear 144 with the primary gear 137 engaged with the primary driven gear 138, a battery 165 storing electricity generated by the regenerative brake motor 142, an electromagnetic switch 166 for disconnection/connection between the battery 165 and the regenerative brake motor 142, a controller 167 to instruct disconnection/connection by the electromagnetic switch 166, a crankshaft sensor 171 coupled with the controller 167 to detect the revolution speed of the crankshaft 93, a primary gear sensor 172 coupled with the controller 167 to detect the revolution speed of the primary driven gear 138, and the one-way clutch 133 provided between the crankshaft 93 and the primary gear 137.

Note that as the primary gear 137 is always engaged with the primary driven gear 138, the revolution speed of the primary gear 137 provided coaxially with the crankshaft 93 is obtained by detecting the revolution speed of the primary driven gear 138 and multiplying the revolution speed of the primary driven gear 138 by a predetermined constant.

Next, the operation of the vehicle having the above-described regenerative brake motor system 164 will be described.

When the revolution speed of the crankshaft 93 and the revolution speed of the primary gear 137 are compared with each other and the revolution speed of the primary gear 137 exceeds the revolution speed of the crankshaft 93, the electromagnetic switch 166 is turned ON for connection between the battery 165 and the regenerative brake motor 142, to cause the regenerative brake motor 142 to generate an eddy current, so as to apply a brake to the primary gear 137, thereby a brake corresponding to an engine brake can be applied to the rear wheel 16. At the same time, electricity is generated by the regenerative brake motor 142 and the generated electricity can be stored in the battery 165.

When the electromagnetic switch 166 is OFF, as an eddy current is not generated in the regenerative brake motor 142, a brake corresponding to an engine brake is not applied to the rear wheel 16.

Figure 6:
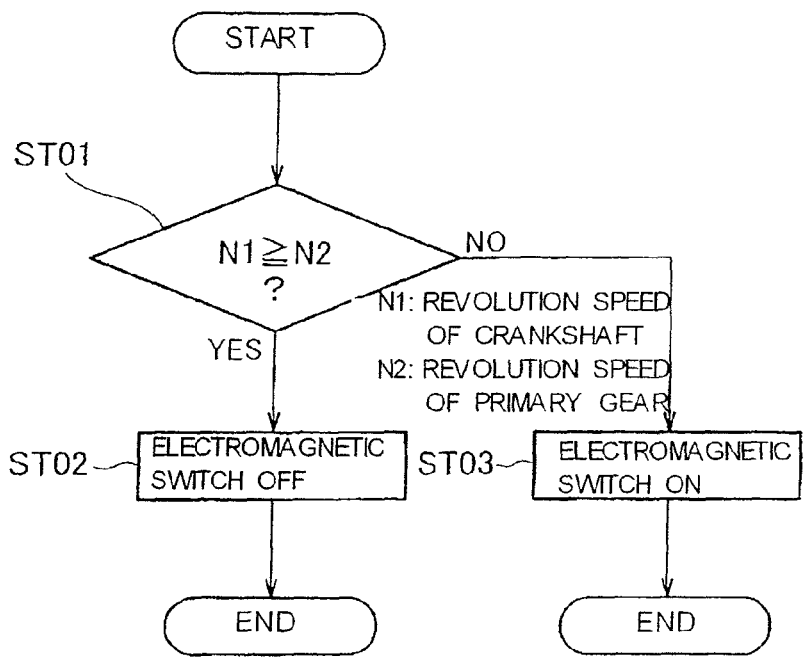
FIG. 6 is an operation flow diagram of FIG. 5.

In FIGS. 5 and 6, at ST01 (hereinbelow, at step STxx, "xx" indicates a step number.), the revolution speed (N1) of the crankshaft 93 and the revolution speed (N2) of the primary gear 137 are compared with each other. When the revolution speed (N1) of the crankshaft 93 is equal to or higher than the revolution speed (N2) of the primary gear 137, the electromagnetic switch 166 is turned OFF (ST02). When the revolution speed (N1) of the crankshaft 93 is lower than the revolution speed (N2) of the primary gear 137, the electromagnetic switch 166 is turned ON (ST03).

During operation of the vehicle such as operation on a downward slope, a so-called engine brake to reduce the number of revolutions of the engine 14 and transmit the torque applied to the rear wheel 16 to the engine 14, and apply a brake to the rear wheel (reference sign 16 in FIG. 1) coupled with the engine 14, is widely used.

In this case, in the present invention, the one-way clutch 133 is provided between the crankshaft 93 and the primary gear 137, such that the torque of the primary gear 137 is blocked and is not transmitted to the crankshaft 93, and the energy related to the torque of the rear wheel 16 is absorbed with the regenerative brake motor 142 engaged with the primary gear 137.

As the energy related to the torque of the rear wheel 16 is absorbed with the regenerative brake motor 142 when the revolution speed of the rear wheel 16 is raised, a braking force corresponding to an engine brake can be applied to the rear wheel 16. At this time, the torque of the primary gear 137 is not transmitted to the crankshaft 93, accordingly, when the number of revolutions of the rear wheel 16 is raised, the number of revolutions of the engine 14 is not raised. That is, it is possible to apply a brake to the rear wheel 16 as a wheel and convert the torque of the rear wheel 16 into electric energy by providing the regenerative brake motor 142 on the primary gear 137.

As the number of revolutions of the engine 14 is not raised when the number of revolutions of the rear wheel 16 is raised, the fuel consumption of the engine 14 can be reduced. In addition, the energy can be effectively utilized by converting the energy by the torque of the rear wheel 16 into electric energy.

Especially in the present invention, the motorcycle 10 is provided with the controller 167 which causes the regenerative brake motor 142 to generate electric energy when the revolution speed of the primary gear 137 is high in the revolution ratio (gear ratio) between the primary gear 137 and the crankshaft 93, while causing the regenerative brake motor 142 to run idle when the revolution speed of the crankshaft 93 is equal to or higher than the revolution ratio (gear ratio) of the revolution speed of the primary gear 137.

The motorcycle 10 is provided with the controller 167 which instructs the regenerative brake motor 142 to run idle when the revolution speed of the crankshaft 93 is equal to or lower than the revolution speed of the primary gear 137. As the regenerative brake motor 142 is caused to run idle when it is not necessary to apply an engine brake to the vehicle, the fuel consumption of the engine 14 can be further reduced.

Further, in the engine provided with the above-described throttle by wire, optimum fuel consumption can be attained by operating an accelerator using the throttle by wire.

Further, when the accelerator (throttle valve) is once returned (closed) and opened again, a difference between the number of revolutions of the crankshaft and the number of revolutions of the primary gear occurs, however, adjustment can be performed by the throttle by wire such that the number of revolutions are smoothly brought into correspondence (the revolution of the crankshaft and the revolution of the primary gear are engaged with each other and connected via the one-way clutch) without the occurrence of a shock.

Note that in the present example, the regenerative brake motor is coupled with the primary gear. However, it may be coupled with the primary driven gear, the main shaft, the drive shaft and a rear wheel shaft as a drive shaft of the rear wheel provided on the downstream side from the primary gear without any problem.

Figure 7:
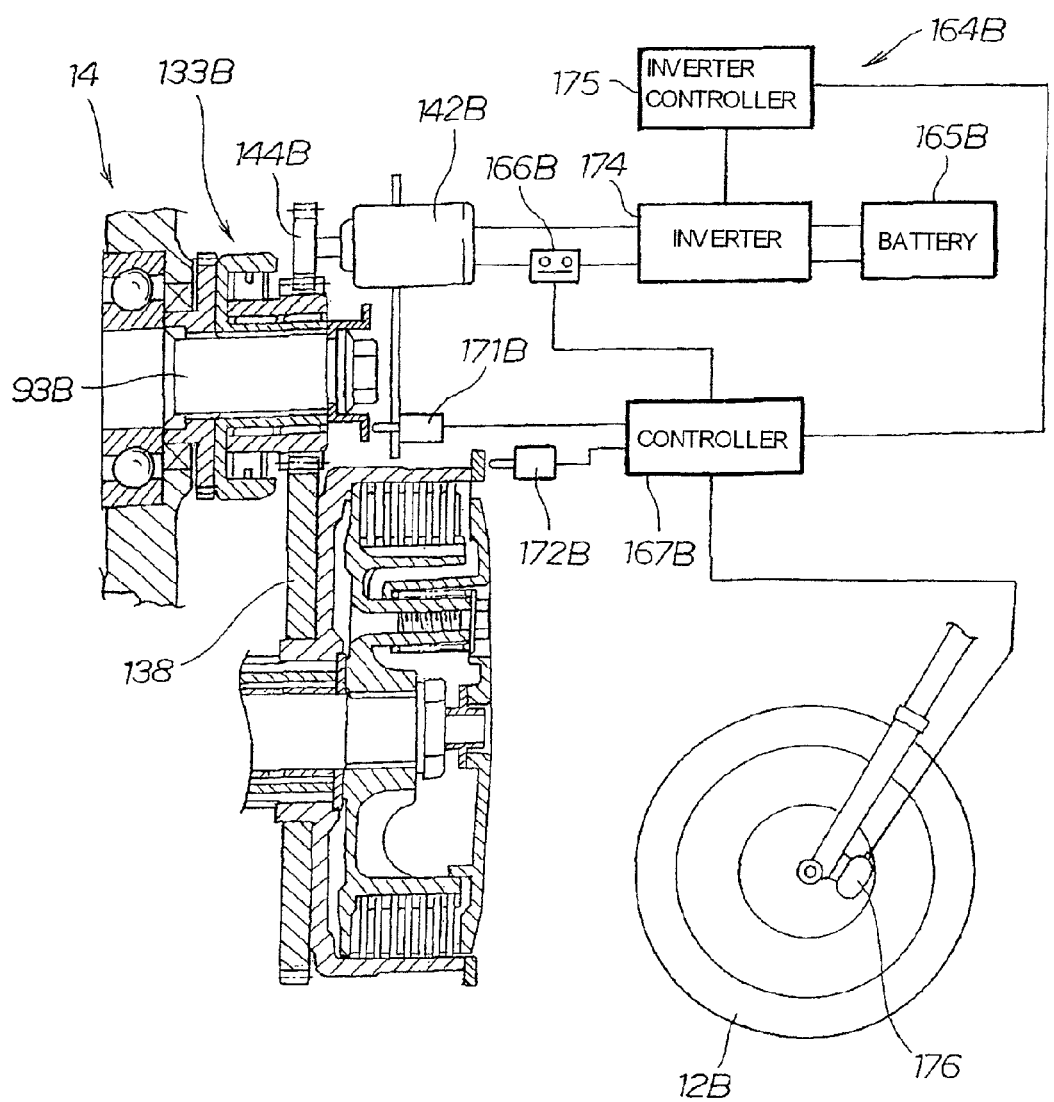
FIG. 7 illustrates another example of FIG. 5.

In FIG. 7, the great difference from FIG. 5 is that in the regenerative brake motor system 164B, an inverter 174 and an inverter controller 175 to control the inverter 174 are added between the regenerative brake motor 142B and the battery 165B and a wheel speed sensor 176 to detect the speed of the vehicle is added to the wheel. In the above-described structure, on a predetermined condition, the regenerative brake motor 142B can be used not only as a generator but also a rear wheel drive motor. There is no great change in the other portions from those in the first example.

Figure 8:
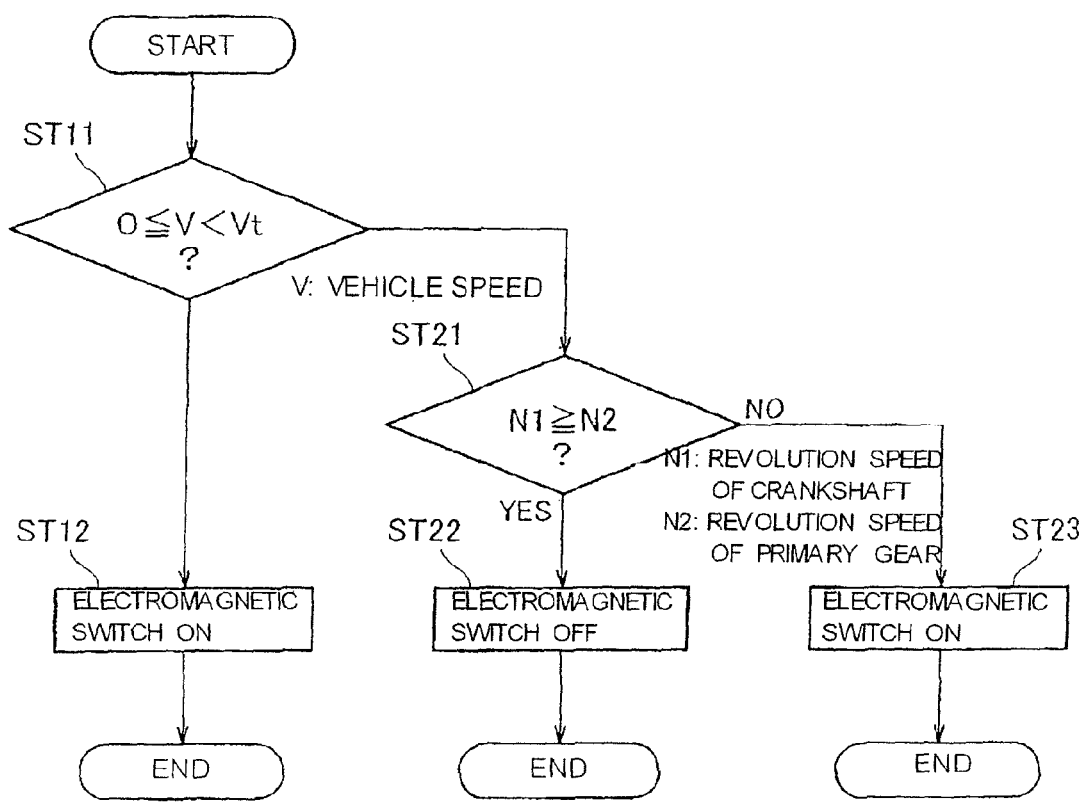
FIG. 8 is an operation flow diagram of FIG. 7.

In FIGS. 7 and 8, at ST11, it is determined whether or not the speed of the vehicle detected by the wheel speed sensor 176 is lower than a predetermined speed (Vt) (ST11).

When it is determined that the speed of the vehicle is lower than the predetermined speed (Vt), an electromagnetic switch 166B is turned ON (ST12), and the regenerative brake motor 142B is used as a rear wheel drive motor. At this time, fuel injection to the engine 14 is cut.

When it is determined that the speed of the vehicle is equal to or higher than the predetermined speed (Vt), on a predetermined condition, the regenerative motor 142B is used as a generator.

At ST21, when it is determined that the speed of the vehicle is equal to or higher than the predetermined speed (Vt), the revolution speed (N1) of a crankshaft 93B and the revolution speed (N2) of a primary gear 137B are compared with each other. When it is determined that the revolution speed (N1) of the crankshaft 93B is equal to or higher than the revolution speed (N2) of the primary gear 137B, the electromagnetic switch 166B is turned OFF (ST22). When it is determined that the revolution speed (N1) of the crankshaft 93B is lower than the revolution speed (N2) of the primary gear 137B, the electromagnetic switch 166B is turned ON (ST23).

In this manner, in addition to use of the regenerative brake motor 142B as an engine brake (generator), the regenerative brake motor can be effectively utilized as a motor to drive the rear wheel.

Note that the use of the motor is not limited to driving of the rear wheel, but the motor may be arranged on a front wheel.

Figure 9:
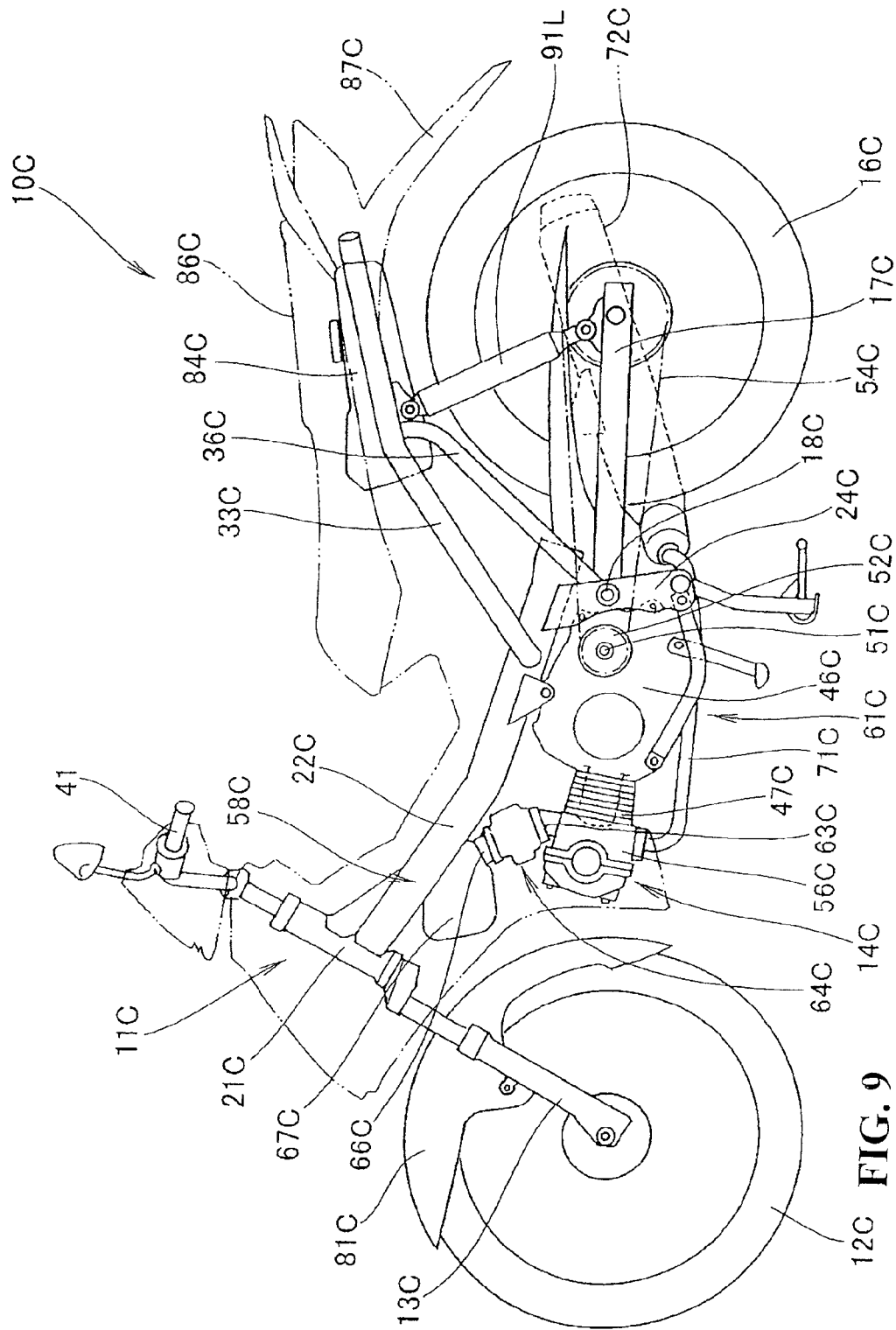
FIG. 9 illustrates another example of FIG. 1.

FIG. 9 indicates that even in a vehicle provided with an engine 14C in which a cylinder 47C is approximately horizontally arranged, it is possible to provide the engine 14C with a one-way clutch and a regenerative brake motor, as in the case of FIG. 1.

The great difference from FIG. 1 is that one main frame 22C is provided at the center in a vehicle width direction, and left and right rear shock absorbers 91L and 91R for supporting a rear wheel 16C are provided. In the engine 14C, the cylinder 47C is provided in a front position in the approximately horizontal direction. There is no great change in the other portions.

Figure 10:
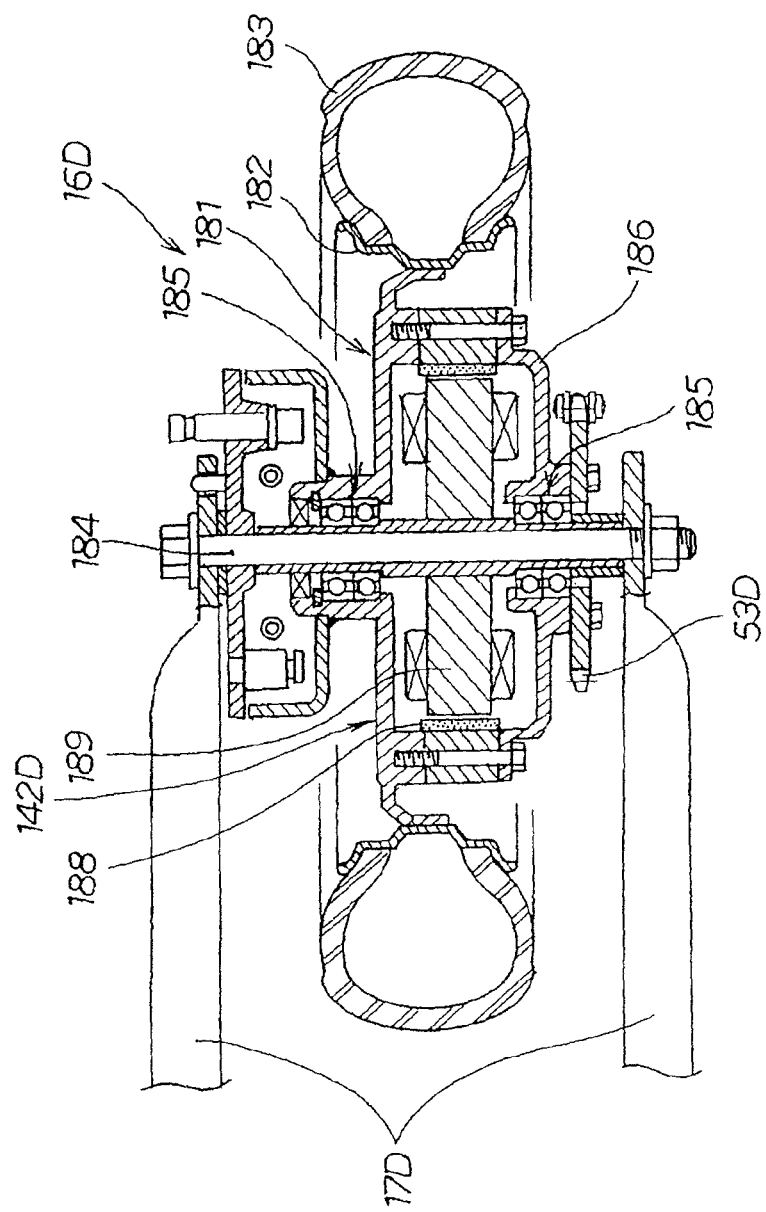
FIG. 10 illustrates another example of FIGS. 1 and 9 and a cross-sectional view of the regenerative brake motor provided on a wheel on the driving side.

FIG. 10 shows an example where the regenerative brake motor 142 is attached to the rear wheel of the motorcycle shown in FIG. 1 or 9.

A rear wheel 16D is supported at a rear end of a rear fork 17D.

The rear wheel 16D has a hub 181 and a rim 182 which is provided around the hub 181 and to which a tire 183 is attached. The hub 181 has a hub case 186 rotatably supported with a rear wheel shaft 184 via a bearing 185.

A rotor 188 of the regenerative brake motor 142D is attached inside the hub case 186, and a stator 189 of the regenerative brake motor 142D is attached to the rear wheel shaft 184 so as to be opposite to the rotor 188.

The regenerative brake motor 142D is coupled with the rear wheel 16D. As the regenerative brake motor 142D can also be utilized as a drive motor to drive the rear wheel 16D, the regenerative brake motor 142D can also be effectively utilized as a motor to drive a wheel.

Figure 11:
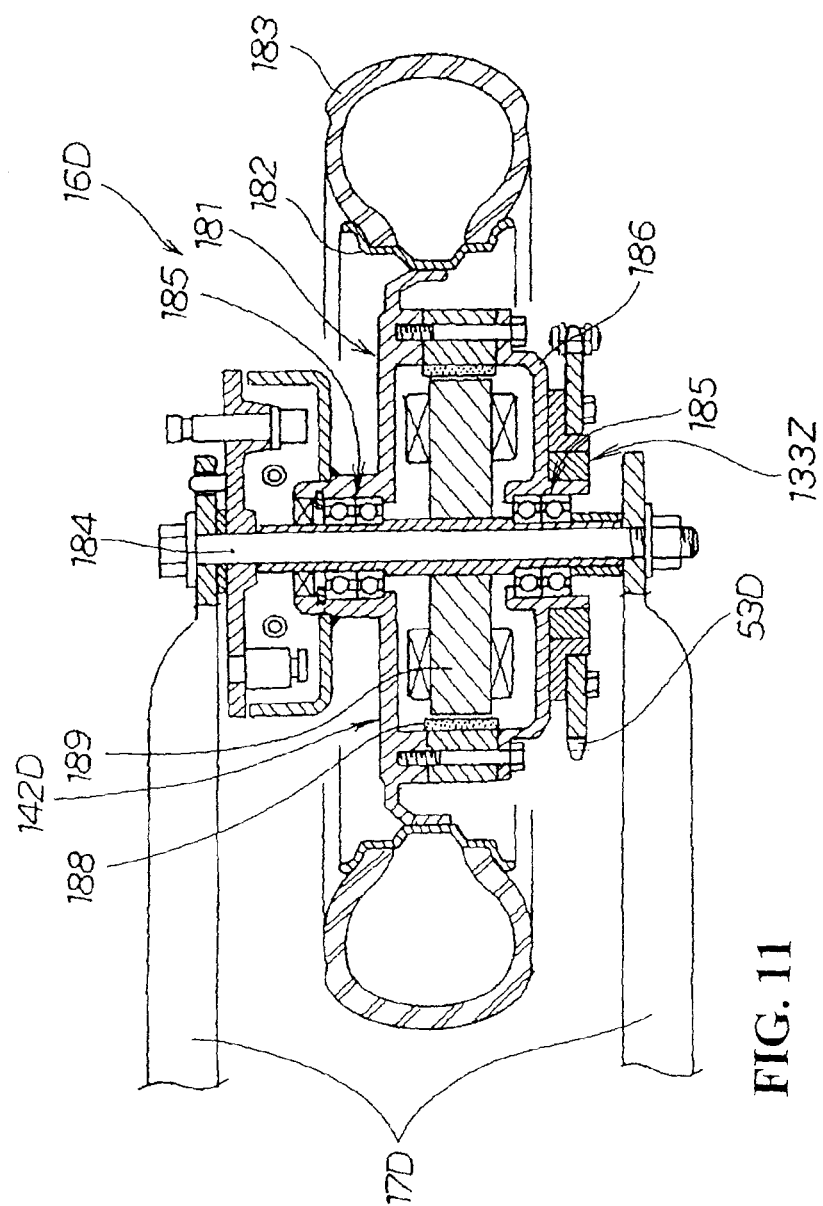
FIG. 11 is a diagram of a modification of FIG. 10.

FIG. 11 shows an example where a one-way clutch 133Z is attached to the rear wheel of the motorcycle. As the other constituent elements are the same as those in FIG. 10, the explanations of the elements will be omitted.

Figure 12:
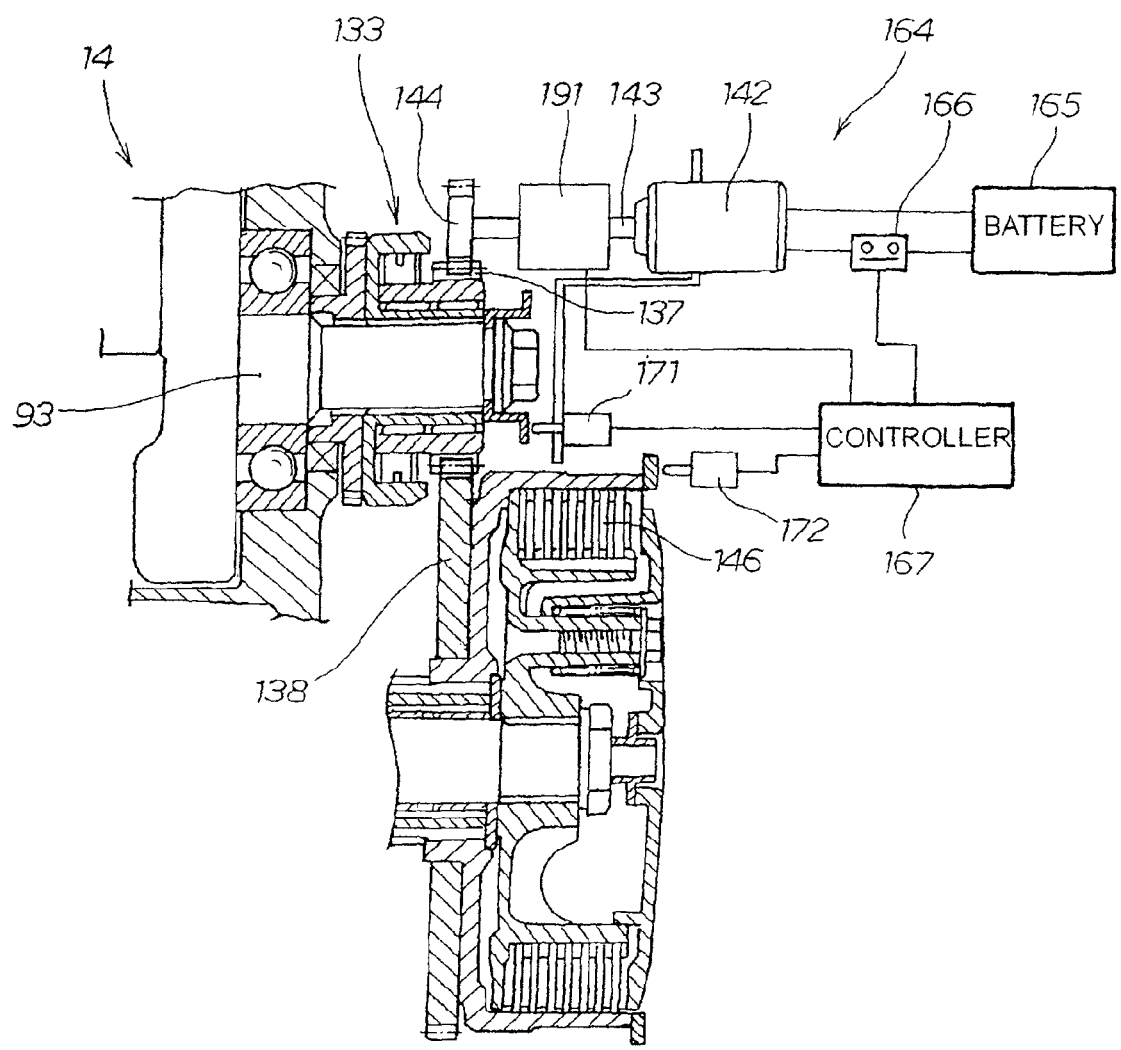
FIG. 12 is a diagram of another example of FIG. 5.

In FIG. 12, a disconnection/connection mechanism 191 is provided between the motor gear 144 and the motor shaft 143 of the regenerative brake motor.

The great difference from FIG. 5 is that the disconnection/connection mechanism 191 for disconnection when the throttle is opened while connection when the throttle is closed is provided between the primary gear 137 and the regenerative brake motor 142. There is no great change in the other portions.

As the disconnection/connection mechanism 191 for disconnection when the throttle is opened while connection when the throttle is closed is provided, co-rotation of the regenerative brake motor 142 can be prevented, and the fuel consumption can be further improved.

Figure 13:
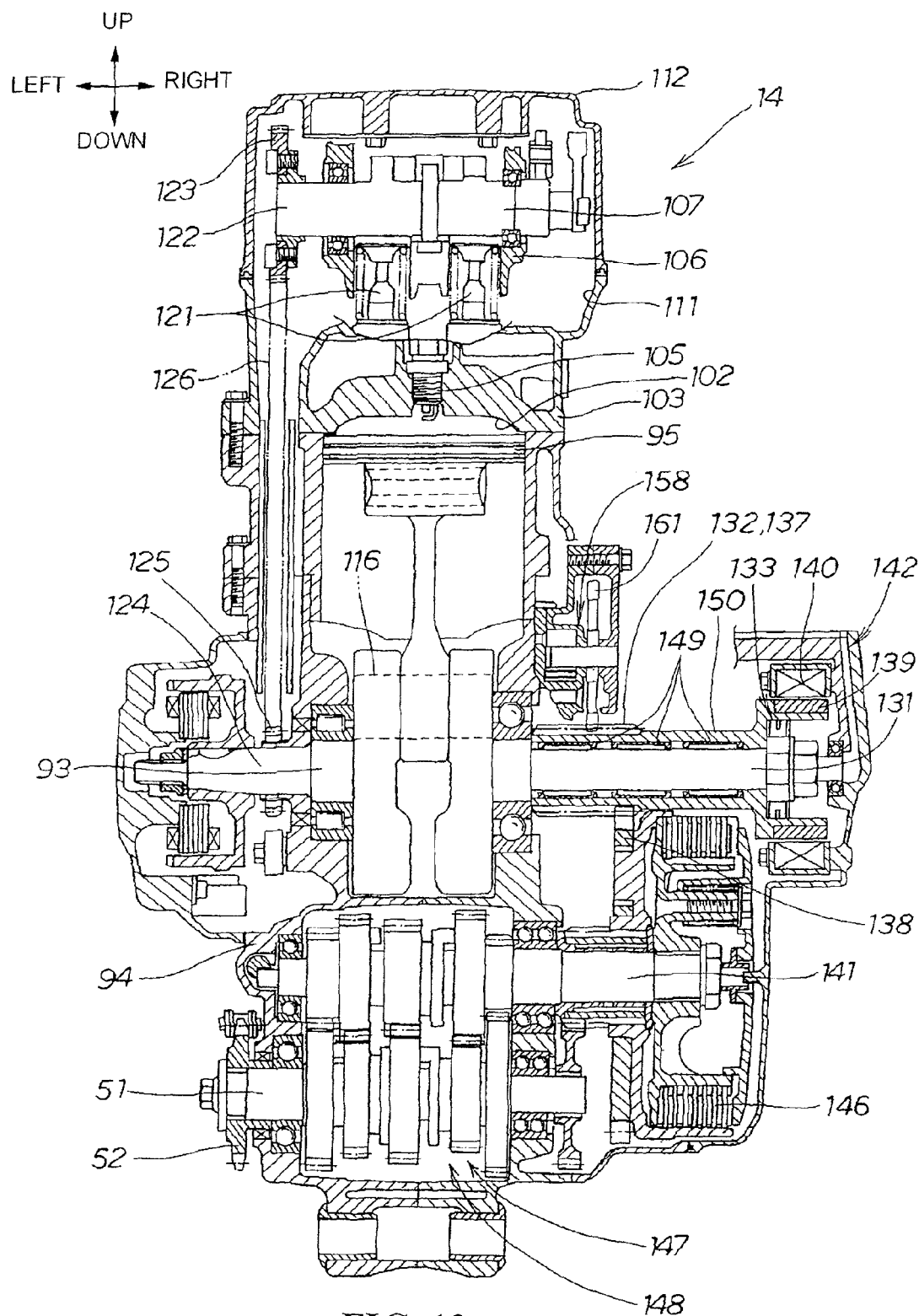
FIG. 13 is a diagram of another example of FIG. 2.

In FIG. 13, the main difference from FIG. 2 is that the regenerative brake motor 142 is provided at the other end 131 of the crankshaft coaxially with the crankshaft. There is no great change in the other portions. Hereinbelow, the changed portion will be described.

The one-way clutch 133 is attached to the other end 131 of the crankshaft, the regenerative brake motor 142 having a rotor 139 and a stator 140 is provided outside the one-way clutch 133, and an outer shaft 150 integrated with the rotor 139 and rotatably fit around the crankshaft 93 via needle bearings 149 ... is provided. The primary gear 137 is attached to the outer shaft 150, and the primary driven gear 138 engaged with the primary gear 137 is provided coaxially with the main shaft 141 provided below the crankshaft 93. The primary gear 137 also functions as the gear 132 to drive the oil pump 158.

The regenerative brake motor 142 enables braking of the rear wheel as a wheel (reference sign 16 in FIGS. 1 and 9) and enables conversion of the torque of the rear wheel 16 into electric energy.

In the FIG. 13, the rotor 139 of the regenerative brake motor is provided coaxially with the primary gear 137 and the one-way clutch 133.

The regenerative brake motor 142 is provided in the engine 14. As the regenerative brake motor 142 is provided at the other end 131 of the crankshaft of the engine 14. Thus, fuel consumption can be reduced without impairing a feeling of the operation of the vehicle as a motorcycle. The vehicle mass centralization can be easily achieved.

Note that the present invention is applied to a motorcycle in the embodiments. However, it is applicable to a three-wheeled vehicle, and is applicable to a general vehicle without any problem. In addition, the present invention is preferable to a motorcycle having a one-way clutch.

Figure 14:
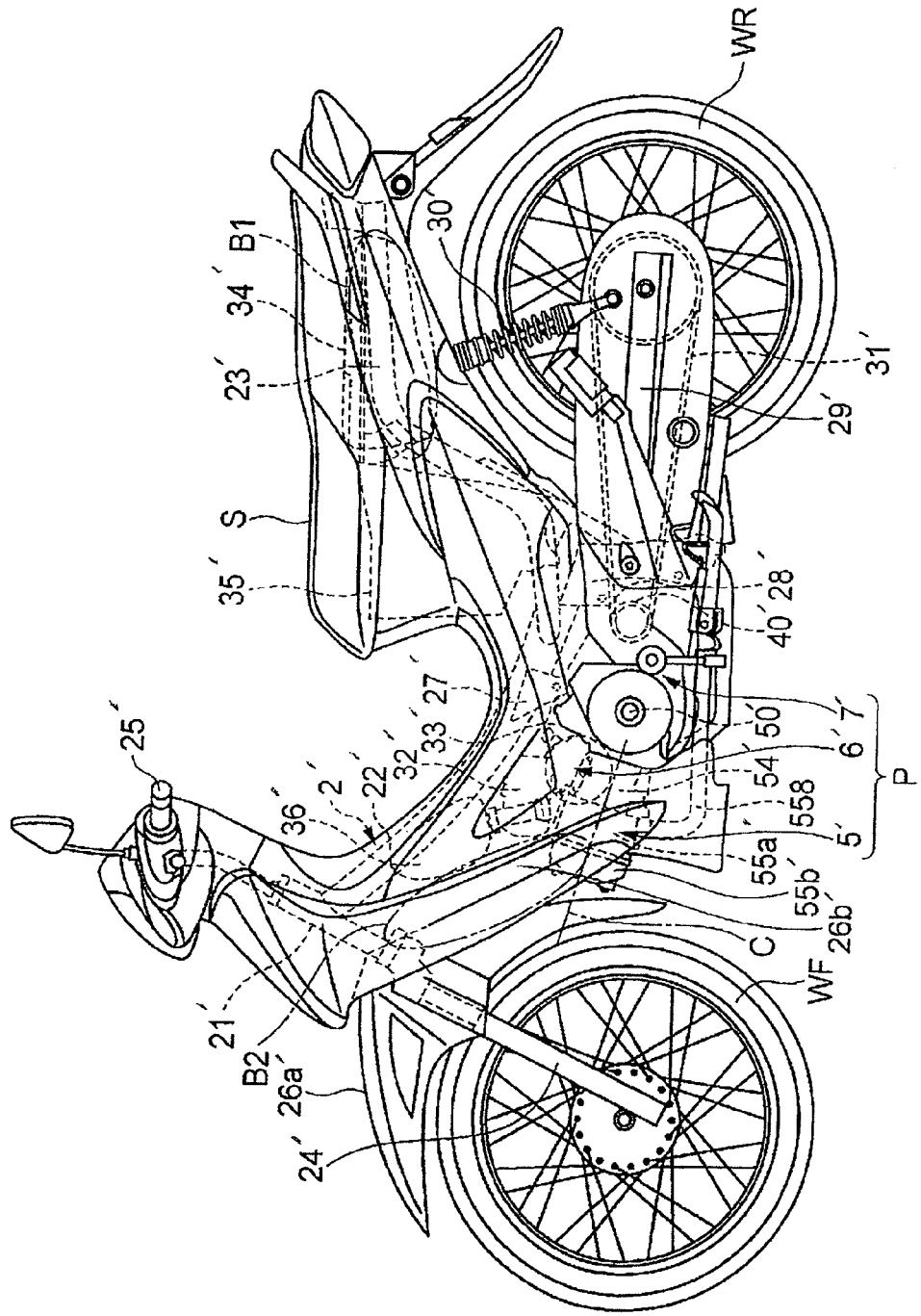
FIG. 14 is a side view of a motorcycle according to an embodiment of a hybrid vehicle of the present invention.

Hereinafter, an embodiment of a hybrid vehicle of the present invention will be described with reference to the accompanying drawings. FIG. 14 is a side view according to an embodiment of the hybrid vehicle of the present invention.

The hybrid vehicle of the present invention is a motorcycle. A body frame 2' of the motorcycle 1' includes a head pipe 21' for steerably supporting a front fork 24', a main frame 22' extending rearward and downward from the head pipe 21', and a pair of left and right rear frames 23' connected to a rear portion of the main frame 22' to extend rearward and upward. A front wheel WF is journaled to a lower end of the front fork 24', and a steering handlebar 25' in a bar shape is coupled to an upper portion of the front fork 24'. A front fender 26a' for covering the front wheel WF from above is supported by the front fork 24'. Also, the motorcycle 1' is provided with leg shields 26b' extending rearward and downward from the upper side of the front fender 26a for protecting legs of an occupant.

Below the main frame 22', there is disposed an engine (an internal combustion engine) 5' with a cylinder axis C in a substantially horizontal direction and with a crankshaft 50' (see FIG. 15) provided to be oriented in a vehicle width direction. The engine 5' is suspended by the body frame 2' in such a manner so as to be supported by hanger plates 27' and a pivot plate 28'.

A front end of a rear fork 29' is supported swingably in a vertical direction on the pivot plate 28', and a rear wheel WR is journaled to a rear end of the rear fork 29'. Also, a rear shock absorber 30 is provided between the rear frames 23' of the body frame 2' and the rear fork 29'.

The engine 5', together with a motor (an electric motor) 6' and a power transmission mechanism 7', constitutes a power unit P to be described later. Also, output of the power transmission mechanism 7' is transmitted to the rear wheel WR serving as a driven portion through a drive chain 31'.

Figure 23:
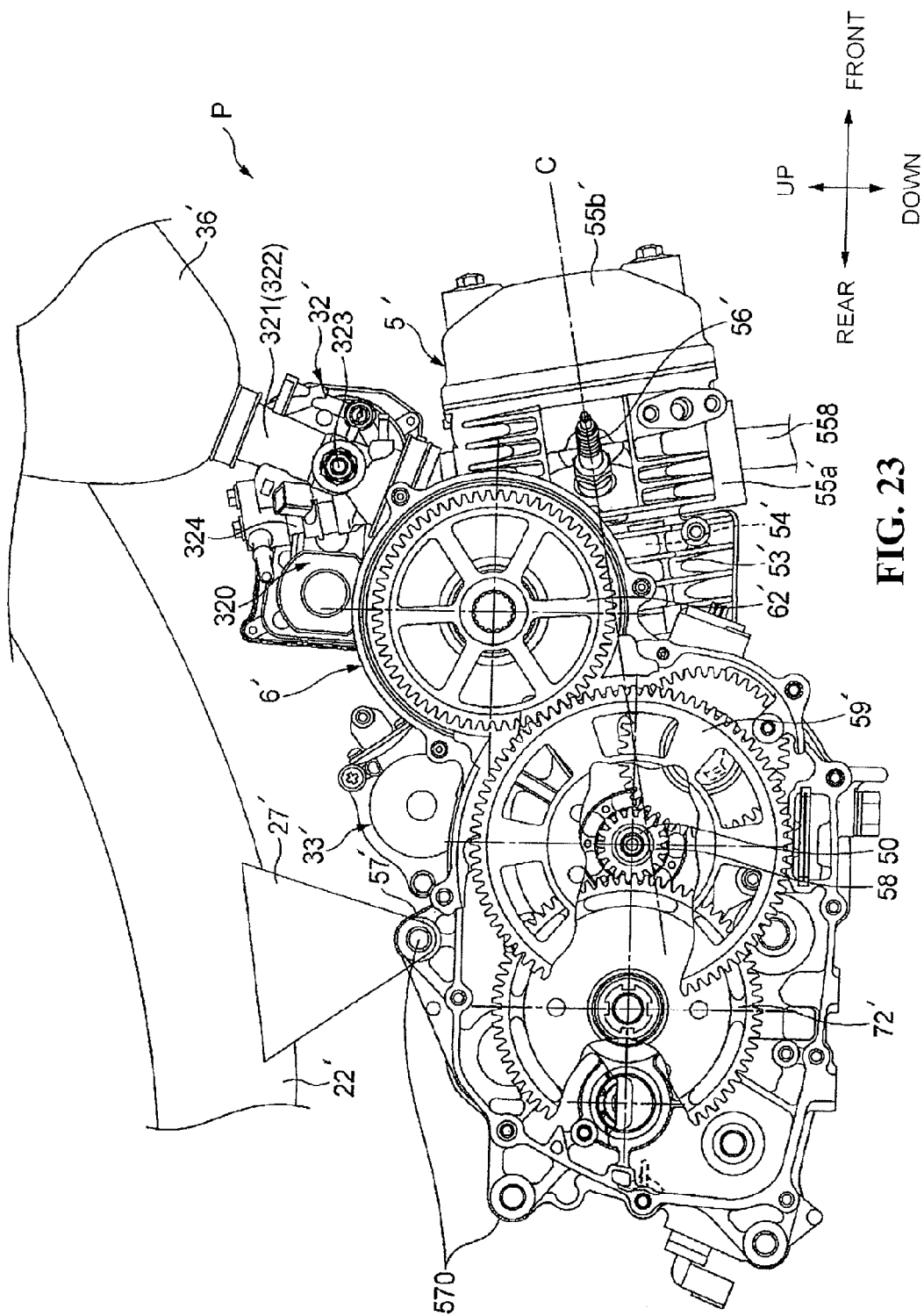
FIG. 23 is a side view with portions broken away of the power unit as seen from a side thereof.

In addition, above the engine 5', there are disposed a throttle mechanism 32', a starter motor 33', and an air cleaner 36' fixed to the main frame 22' (see also FIG. 23). Also, a fuel tank 34' is disposed above the rear wheel WR. A storage box 35', disposed in front of the fuel tank 34', and the fuel tank 34' are covered with a cover that can be opened, from above, with a riding seat S such as a tandem seat.

Figure 15:
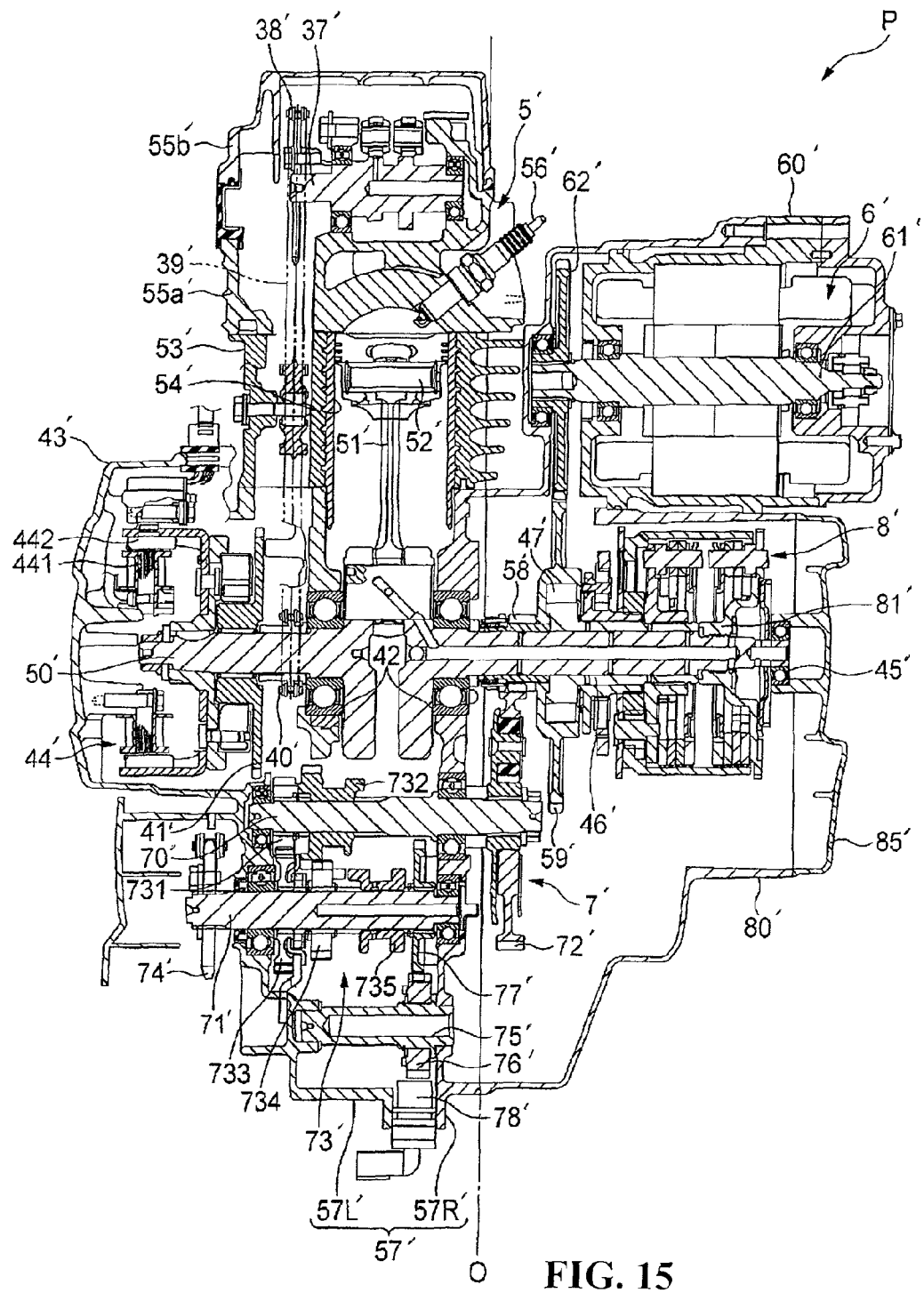
FIG. 15 is a sectional view of a power unit for the motorcycle shown in FIG. 14.
Figure 16:
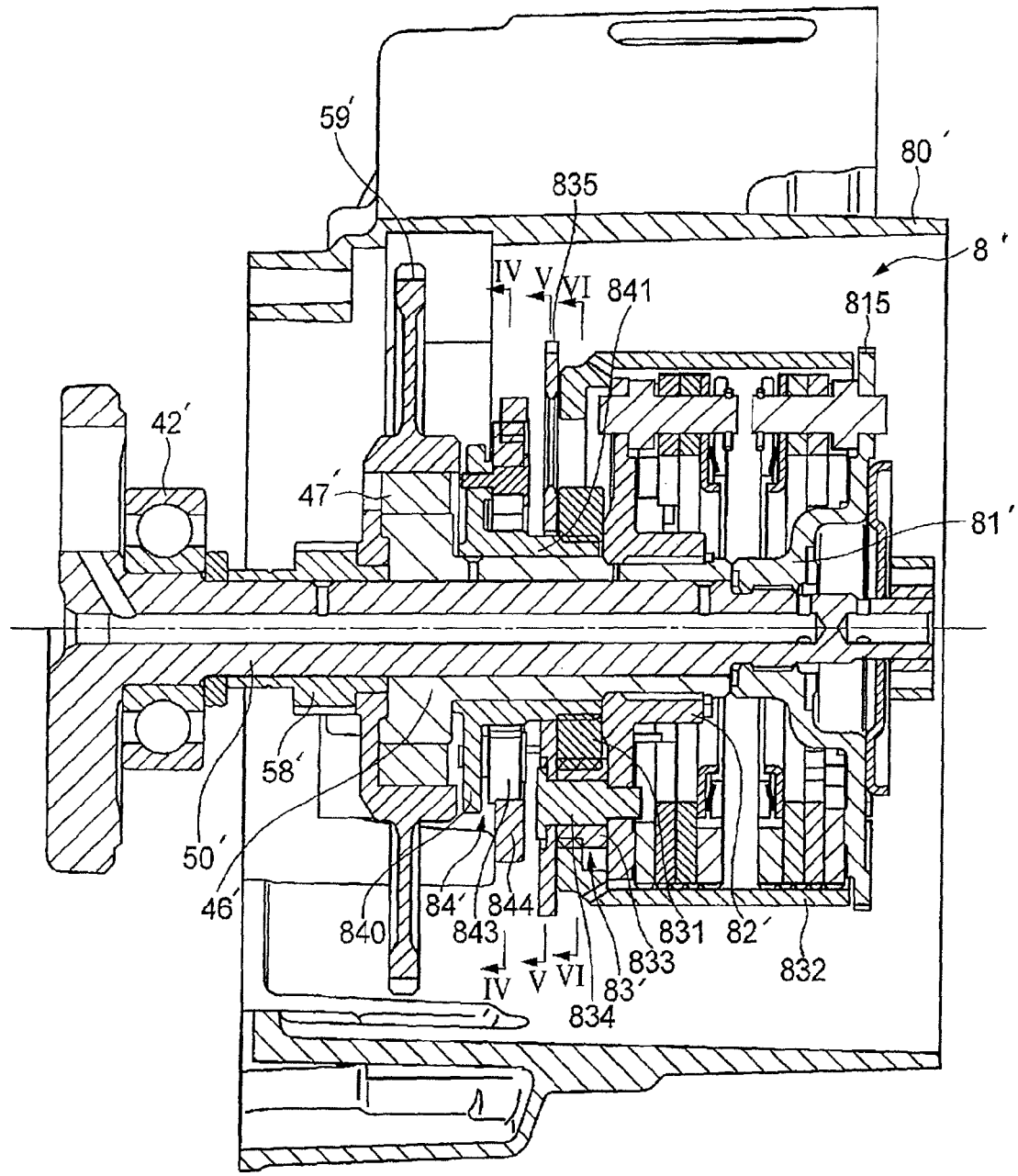
FIG. 16 is a sectional view of a variable speed mechanism of the power unit.
Figure 17:
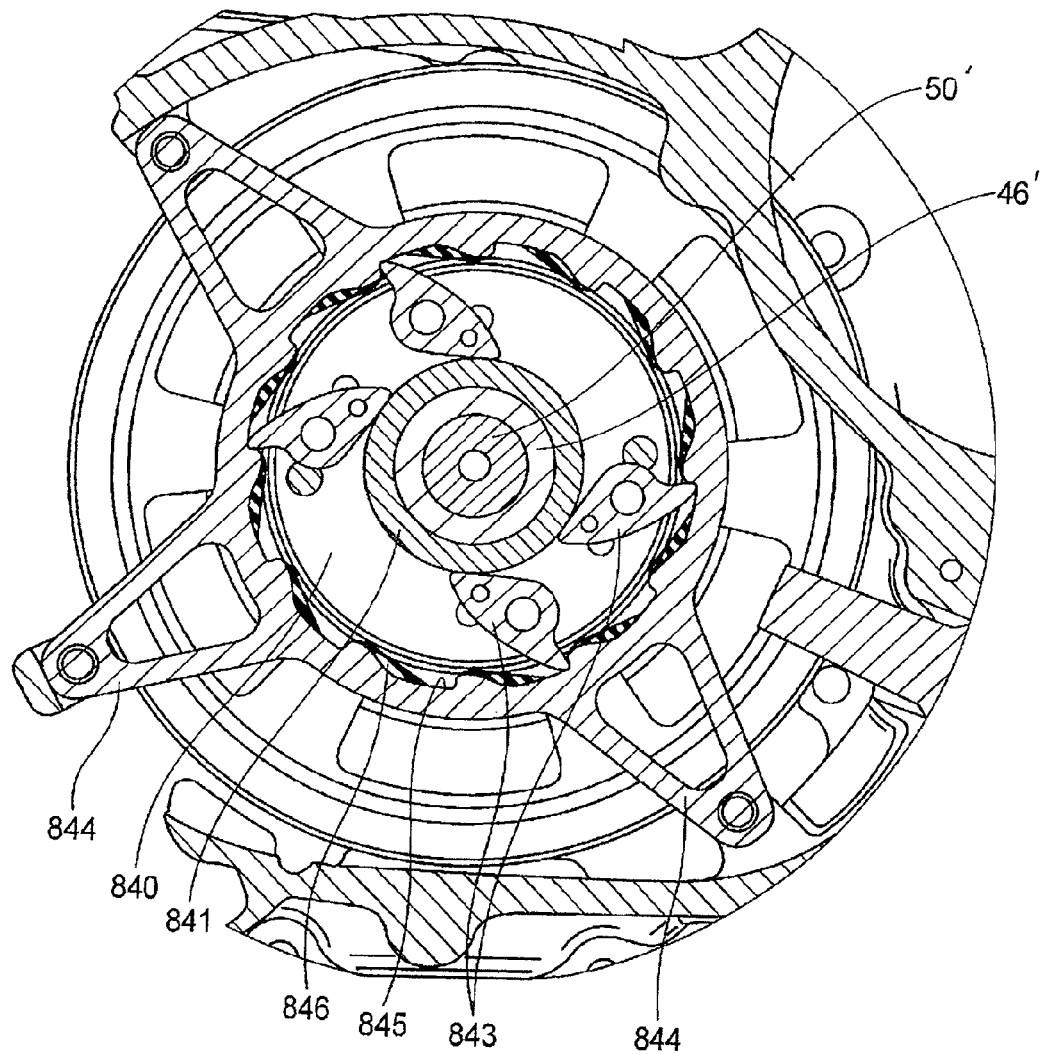
FIG. 17 is a sectional view taken along line IV-IV of FIG. 16.
Figure 18:
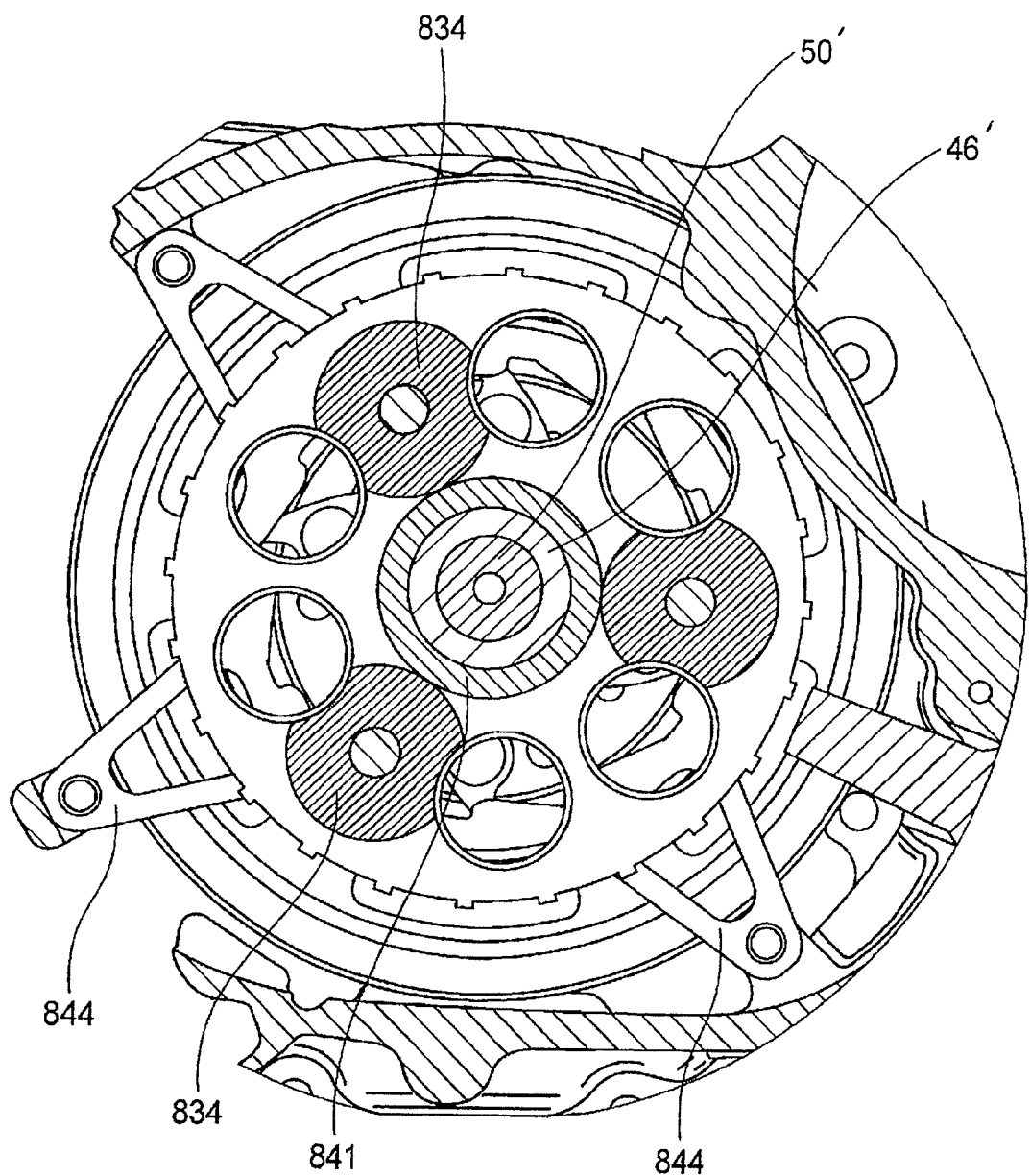
FIG. 18 is a sectional view taken along line V-V of FIG. 16.
Figure 19:
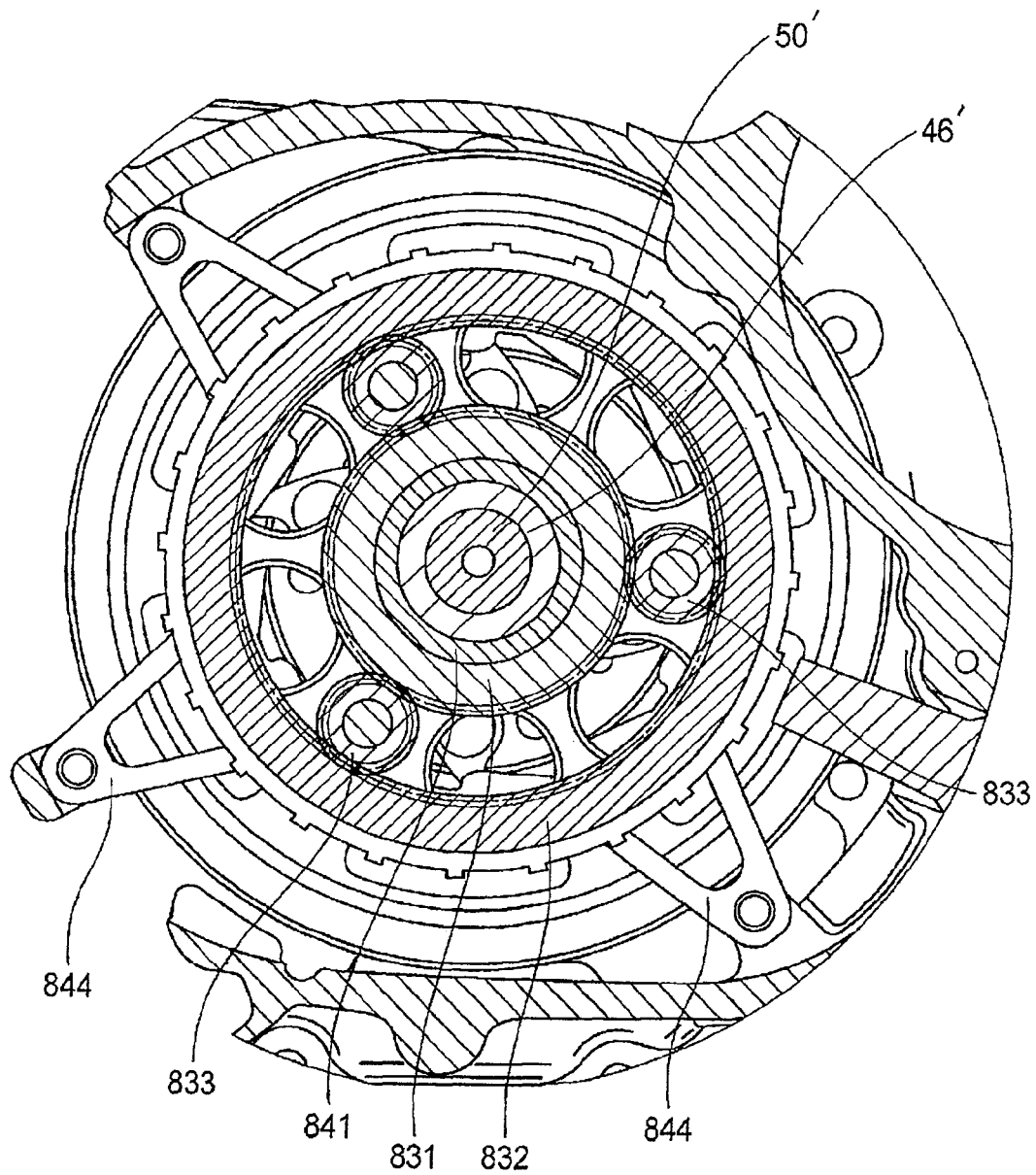
FIG. 19 is a sectional view taken along line VI-VI of FIG. 16.

Hereinafter, a power unit for the hybrid vehicle according to this embodiment will be described in detail with reference to FIGS. 15 to 24. FIG. 15 is a sectional view of the power unit for the motorcycle shown in FIG. 14, in which reference sign O denotes a vehicle center line showing the center in the width direction.

The power unit P is composed chiefly of the engine 5' and the motor 6' serving as drive sources, the power transmission mechanism 7' for transmitting power of the engine 5' and the motor 6' to the rear wheel WR, a double centrifugal clutch 8' serving as a variable speed mechanism for shifting power of the engine 5' between the engine 5' and the power transmission mechanism 7' to transmit the power to the power transmission mechanism 7', and an oil pump 9'.

A battery not shown is connected to the motor 6' and the starter motor 33'. When the motor 6' functions as a motor and when the starter motor 33' functions as a starter, the battery is configured to supply power to the motor 6' and the starter motor 33'. Also, when the motor 6 functions as a generator, the battery is configured to be charged with regenerative electric power. The battery may be mounted, for example, in a space axially adjacent to the fuel tank 34' as shown by reference sign B1 of FIG. 14 or alternatively, may be mounted in a space within the left and right leg shields 26b' as shown by reference sign B2.

A throttle valve for controlling the amount of air is turnably provided within an intake pipe of the engine 5'. The throttle valve (not shown) is housed within the throttle mechanism 32' to be turned according to a manipulated variable of a throttle grip (not shown) operated by an occupant. In this embodiment, there is installed a TBW (throttle-by-wire) system for detecting an accelerator opening operated by the occupant and calculating an optimum opening of the throttle valve on the basis of the detected accelerator opening and signals from various kinds of sensors to perform opening and closing of the throttle valve not shown with an actuator 320 (see FIG. 23) on the basis of the calculated throttle opening. In FIG. 23, reference sign 321 denotes a throttle body constituting an intake passage 322 connecting the engine 5' and the air cleaner 36'; 323, a throttle valve shaft; 324, an injector; 570, an engine hanger.

The engine 5' includes a piston 52' coupled to the crankshaft 50' through a connecting rod 51'. The piston 52' is slidable within a cylinder 54' provided in a cylinder block 53', and the cylinder block 53' is provided in such a manner that the axis C of the cylinder 54' is substantially horizontal. A cylinder head 55a' and a head cover 55b' are fixed to a front surface of the cylinder block 53'. Also, a combustion chamber for burning an air-fuel mixture therein is formed by the cylinder head 55a', the cylinder 54', and the piston 52'. As shown in FIG. 14, the leg shield 26b' is provided on either side of the head cover 55b'.

In the cylinder head 55a', there are provided a valve (not shown) for controlling intake or exhaust of the air-fuel mixture into or from the combustion chamber, and a spark plug 56'. The opening and closing of the valve is controlled by rotation of a camshaft 37' journaled to the cylinder head 55a'. The camshaft 37' is provided with a driven sprocket 38' on one end thereof, and an endless cam chain 39 is stretched between the driven sprocket 38' and a drive sprocket 40' provided on one end of the crankshaft 50'. Also, a starter driven gear 41' connected to the starter motor 33' is integrally attached, by spline-fitting, to the crankshaft 50', adjacent to the drive sprocket 40'.

The crankshaft 50' is supported through respective bearings 42' by a left crankcase 57L' and a right crankcase 57R' (hereinafter, the combination of the left crankcase 57L' and the right crankcase 57R' will be referred to as a crankcase 57'). A stator case 43' is coupled to the left side in the lateral direction of the crankcase 57', and an alternator 44' (an AC generator ACG) serving as an outer rotor motor is accommodated within the stator case 43'. A crankcase cover 80' for containing the double centrifugal clutch 8' is coupled to the right side in the lateral direction of the crankcase 57'. In addition, a clutch cover 85' for supporting the crankshaft 50' through a bearing 45' is coupled to a right-hand edge of the crankcase cover 80'. A motor case 60' is coupled to a space in front of the inside of the crankcase cover 80', lateral to the cylinder block 53'. The motor 6' with a motor drive gear 62' attached to a motor output shaft 61', is integrally accommodated within the motor case 60'.

Furthermore, an outer rotor 442 opposed to an inner stator 441 constituting the alternator 44' is attached to a left-hand end of the crankshaft 50', and a first clutch inner 81' of the double centrifugal clutch 8' is spline-fitted in a right-hand end of the crankshaft 50'. Also, on the crankshaft 50', a primary drive gear 58' and an outer circumferential shaft 46' (outer circumferential cylinder) are disposed between the connecting rod 51' and the first clutch inner 81' in such a manner as to be rotatable relative to the crankshaft 50' and to cover the outer circumference of the crankshaft 50'.

The primary drive gear 58' engages with a primary driven gear 72' attached to a main shaft 70' of the power transmission mechanism 7' to be described later. Also, a driven gear 59' having a diameter larger than that of the primary drive gear 58' is attached adjacent to the primary drive gear 58' in an integrally rotatable manner.

The driven gear 59' engages with the motor drive gear 62', with an inner diameter of the driven gear 59' configured to have a right-hand opening space, and is connected to the outer circumferential shaft 46' through a one-way clutch 47' accommodated in the space. Also, the driven gear 59' and the motor case 60' are disposed in an overlapping manner in side view.

The one-way clutch 47' is engaged to transmit power from the outer circumferential shaft 46' to the driven gear 59' when the rotational speed of the outer circumferential shaft 46' is higher than that of the driven gear 59', and the one-way clutch 47' is disengaged to cut off transmission of power when the rotational speed of the driven gear 59' is higher than that of the outer circumferential shaft 46'.

The double centrifugal clutch 8' is composed of, for example, as shown in FIGS. 17 to 20, the first clutch inner 81', a second clutch inner 82', a planetary gear mechanism 83', and a ratchet clutch mechanism 84'. As described above, the first clutch inner 81' is spline-fitted in the crankshaft 50' to rotate integrally with the crankshaft 50'. On the other hand, the second clutch inner 82' is spline-fitted in the outer circumference of the outer circumferential shaft 46' to be configured to rotate integrally with the outer circumferential shaft 46'.

The planetary gear mechanism 83' is composed of a sun gear 831, a ring gear 832, planetary gears 833 to engage between the sun gear 831 and the ring gear 832, and planetary carriers 834 for supporting the planetary gears 833. The planetary carriers 834 are connected to the second clutch inner 82' to be configured to rotate integrally therewith.

The ring gear 832 functions as a clutch outer of the first clutch inner 81' and the second clutch inner 82'. When the rotational speed of the first clutch inner 81' reaches a first predetermined rotational speed, a weight of the first clutch inner 81' comes into contact with an inner peripheral surface of the ring gear 832 to be brought into an engaged state. Further, when the rotational speed of the second clutch inner 82' reaches a second predetermined rotational speed higher than the first predetermined rotational speed, a weight of the second clutch inner 82' comes into contact with an inner peripheral surface of the ring gear 832 to be brought into an engaged state. The sun gear 831 is connected to the ratchet clutch mechanism 84'.

The ratchet clutch mechanism 84' is composed of a ratchet supporting member 841 disposed on the outer circumference of the outer circumferential shaft 46' in a relatively rotatable manner and having a flange 840; plurality of ratchets 843 supported by the flange 840; and a ratchet receiving portion 844 extended from the crankcase cover 80'. The sun gear 831 of the planetary gear mechanism 83' is spline-fitted in the outer circumference of the ratchet supporting member 841 to be configured to rotate integrally therewith. Also, when the ratchet supporting member 841 attempts to rotate counterclockwise using power from the sun gear 831, the ratchets 843 engage with grooves 845 of the ratchet receiving portion 844 extending from the crankcase cover 80' to lock the rotation of the ratchet supporting member 841. On the contrary, when the ratchet supporting member 841 attempts to rotate clockwise, on the contrary, the ratchets 843 do not engage with the grooves 845 of the ratchet receiving portion 844 to idle the ratchet supporting member 841. Also, vibration-proof rubbers 846 are attached by baking to the respective grooves 845.

In the double centrifugal clutch 8' constructed in this manner, when the rotational speed of the crankshaft 50' is lower than the first predetermined rotational speed, the first clutch inner 81' rotated integrally with the crankshaft 50' has non-contact with an inner peripheral surface of the ring gear 832 to be brought into a disengaged state, so that power of the crankshaft 50' is prevented from being transmitted to the power transmission mechanism 7'.

On the other hand, when the rotational speed of the crankshaft 50' reaches the first predetermined rotational speed, the weight of the first clutch inner 81' comes into contact with an inner peripheral surface of the ring gear 832 to be brought into an engaged state. At this time, the ring gear 832 rotates clockwise, and the planetary carriers 834 also rotate clockwise through the planetary gears 833 engaging with the ring gear 832, so that a counterclockwise rotational torque acts on the sun gear 831. Also, a counterclockwise rotational torque acts on the ratchets 843 through the ratchet supporting member 841 spline-fitted in the sun gear 831 to engage the ratchets 843 with the grooves 845 of the ratchet receiving portion 844, thereby locking the sun gear 831. Therefore, power transmitted from the crankshaft 50' to the planetary carriers 834 is decelerated to be transmitted to the outer circumferential shaft 46' rotated integrally with the planetary carriers 834. When the rotational speed of the outer circumferential shaft 46' is higher than that of the driven gear 59' engaging with the motor drive gear 62', the one-way clutch 47' is engaged to transmit power of the crankshaft 50' to the primary drive gear 58' rotated integrally with the driven gear 59', and then transmit the power to the power transmission mechanism 7' through the primary driven gear 72' by engagement of the primary driven gear 72 with the primary drive gear 58'.

On the other hand, when, through the drive of the motor 6', the rotational speed of the driven gear 59' is higher than that of the outer circumferential shaft 46', the one-way clutch 47' is disengaged to prevent power of the crankshaft 50' from being transmitted to the power transmission mechanism 7'.

Also, when, through the engagement of the first clutch inner 81', the rotational speed of the second clutch inner 82' following the rotation of the planetary carriers 834 reaches the second predetermined rotational speed, the weight of the second clutch inner 82' comes into contact with the inner peripheral surface of the ring gear 832 to be brought into an engaged state. At this time, the ring gear 832 and the planetary carriers 834 rotate integrally through the second clutch inner 82', and are also integrated with the sun gear 831. That is to say, the planetary gear mechanism 83' is brought into an integrated state. At this time, a clockwise rotational torque acts on the ratchets 843 through the ratchet supporting member 841 spline-fitted in the sun gear 831, and the ratchets 843 do not engage with the grooves 845 of the ratchet receiving portion 844 to idle the ratchet supporting member 841. Therefore, power transmitted from the crankshaft 50' to the planetary gear mechanism 83' is transmitted, without decelerating, to the outer circumferential shaft 46' rotated integrally with the planetary carriers 834. Also, when the rotational speed of the outer circumferential shaft 46' is higher than that of the driven gear 59' engaging with the motor drive gear 62' of the motor 6, the one-way clutch 47' is engaged to transmit power of the crankshaft 50' to the primary drive gear 58' rotated integrally with the driven gear 59', and then transmit the power to the power transmission mechanism 7' through the primary driven gear 72' by engagement of the primary driven gear 72' with the primary drive gear 58'.

On the other hand, when, through the drive of the motor 6', the rotational speed of the driven gear 59' is higher than that of the outer circumferential shaft 46', the one-way clutch 47' is disengaged to prevent power of the crankshaft 50' from being transmitted to the power transmission mechanism 7'.

As described above, the motor 6' is constructed with the motor drive gear 62' attached to the motor output shaft 61', and the motor drive gear 62' always engages with the driven gear 59' provided around the crankshaft 50'. Therefore, the power of the motor 6' is transmitted to the driven gear 59 by engagement of the motor drive gear 62' and the driven gear 59' with each other, and then, transmitted from the primary drive gear 58' rotated integrally with the driven gear 59' to the power transmission mechanism 7' through the primary driven gear 72' by engagement of the primary driven gear 72' with the primary drive gear 58'. The driven gear 59' is connected to the outer circumferential shaft 46' through the one-way clutch 47'. Therefore, the power of the motor 6' is transmitted to the power transmission mechanism 7' only when the rotational speed of the driven gear 59' is higher than that of the outer circumferential shaft 46'. At this time, the one-way clutch 47' is disengaged to prevent the power of the motor 6' from being transmitted to the outer circumferential shaft 46'. On the other hand, when the rotational speed of the outer circumferential shaft 46' is higher than that of the driven gear 59', the power of the crankshaft 50' is transmitted to the power transmission mechanism 7', so that the motor 6' follows the rotation of the crankshaft 50'. At this time, according to the state of charge (SOC) of the battery, an assist by the motor 6' may be carried out or alternatively, regenerative charge may be performed. Also, the load can be reduced by zero torque control.

Next, the power transmission mechanism 7' will be described.

The power transmission mechanism 7' is provided with a variable speed portion 73' between the main shaft 70' and a countershaft 71'. As described above, the primary driven gear 72' to engage with the primary drive gear 58 provided on the outer circumference of the crankshaft 50', is attached to a right-hand end of the main shaft 70'. A drive sprocket 74' is attached to a left-hand end of the countershaft 71', and the power transmitted to the main shaft 70' is transmitted to the rear wheel WR through the drive chain 31' (see FIG. 14) wound around the drive sprocket 74'. On a right-hand end of the countershaft 71', there is provided a vehicle-speed detecting output gear 77' to engage with a vehicle-speed detecting input gear 76' rotatably provided on a sub-shaft 75'. Also, in the crankcase 57', a detector 78' for detecting speed is provided at a position opposite to the vehicle-speed detecting input gear 76'.

The variable speed portion 73' is composed of a low-speed drive gear 731 provided on the outer circumference of the main shaft 70' in a relatively rotatable manner; a high-speed drive-shifter gear 732 disposed on the outer circumference of the main shaft 70' to rotate integrally with the main shaft 70', and provided slidably along an axis of the main shaft 70'; a low-speed driven gear 733 spline-fitted in the outer circumference of the countershaft 71' to rotate integrally with the countershaft 71'; a high-speed driven gear 734 provided on the outer circumference of the countershaft 71' in a relatively rotatable manner; and a shifter 735 disposed on the outer circumference of the countershaft 71' to rotate integrally with the countershaft 71', and provided slidably along an axis of the countershaft 71'. The low-speed drive gear 731 and the low-speed driven gear 733 always engage with each other to constitute a low-speed gear pair 736. The high-speed drive-shifter gear 732 and the high-speed driven gear 734 always engage with each other to constitute a high-speed gear pair 737.

Under normal conditions, the variable speed portion 73' is set so that the vehicle travels in a drive mode using the high-speed gear pair 737. When a larger torque is required, the vehicle is allowed to travel in a low-speed mode using the low-speed gear pair 736. Therefore, an occupant swings a shift pedal (not shown), thereby shifting from neutral to the drive mode, or to the low-speed mode.

Figure 20:
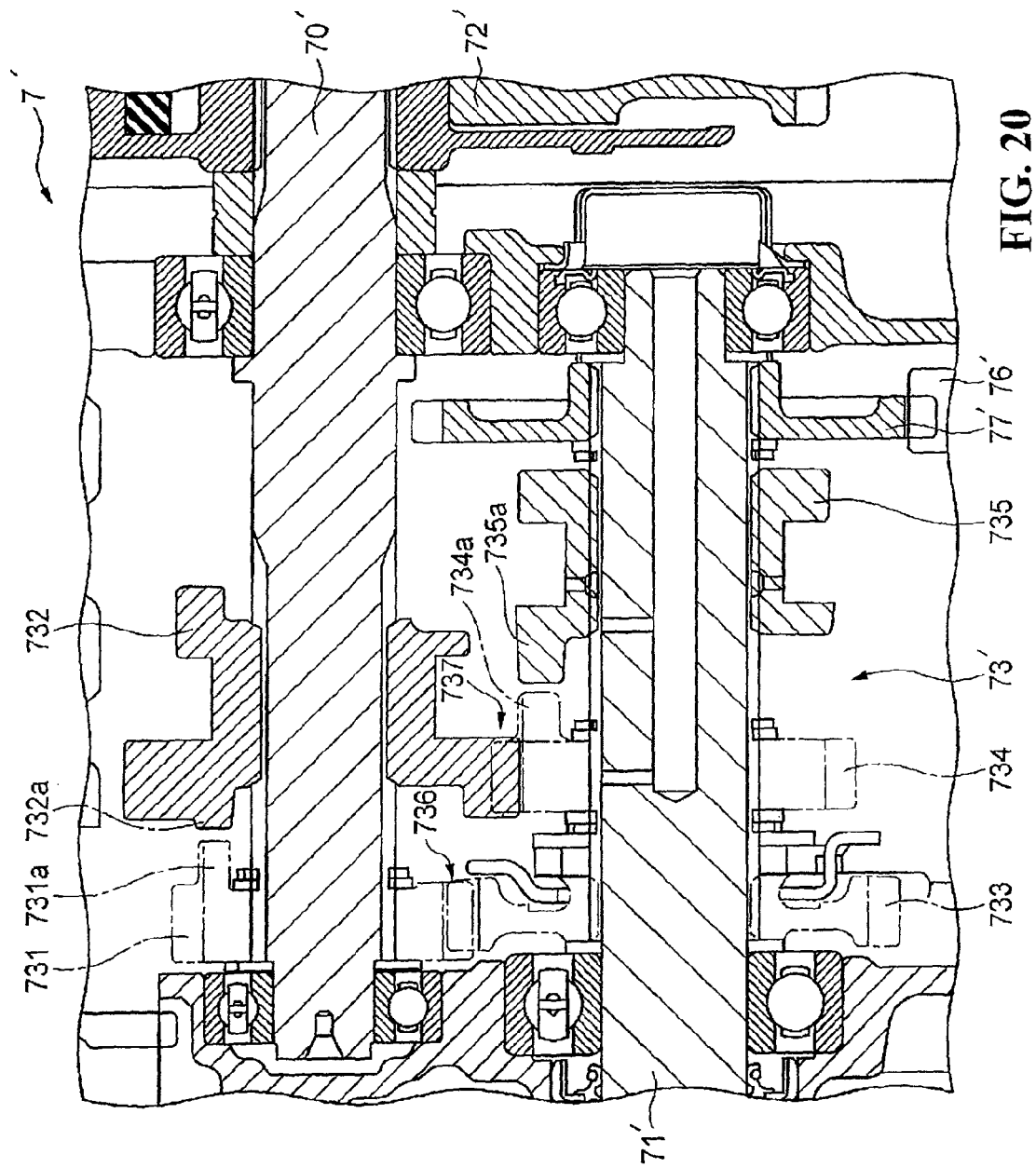
FIG. 20 is a sectional view, in neutral, of a variable speed portion of the power unit.

In neutral, as shown in FIG. 20, the high-speed drive-shifter gear 732 and the low-speed drive gear 731 do not engage with each other. Also, the shifter 735 and the high-speed driven gear 734 do not engage with each other. Even when the main shaft 70' rotates, therefore, transmission of power to the countershaft 71' through both the low-speed gear pair 736 and through the high-speed gear pair 737 is prevented.

Figure 21:
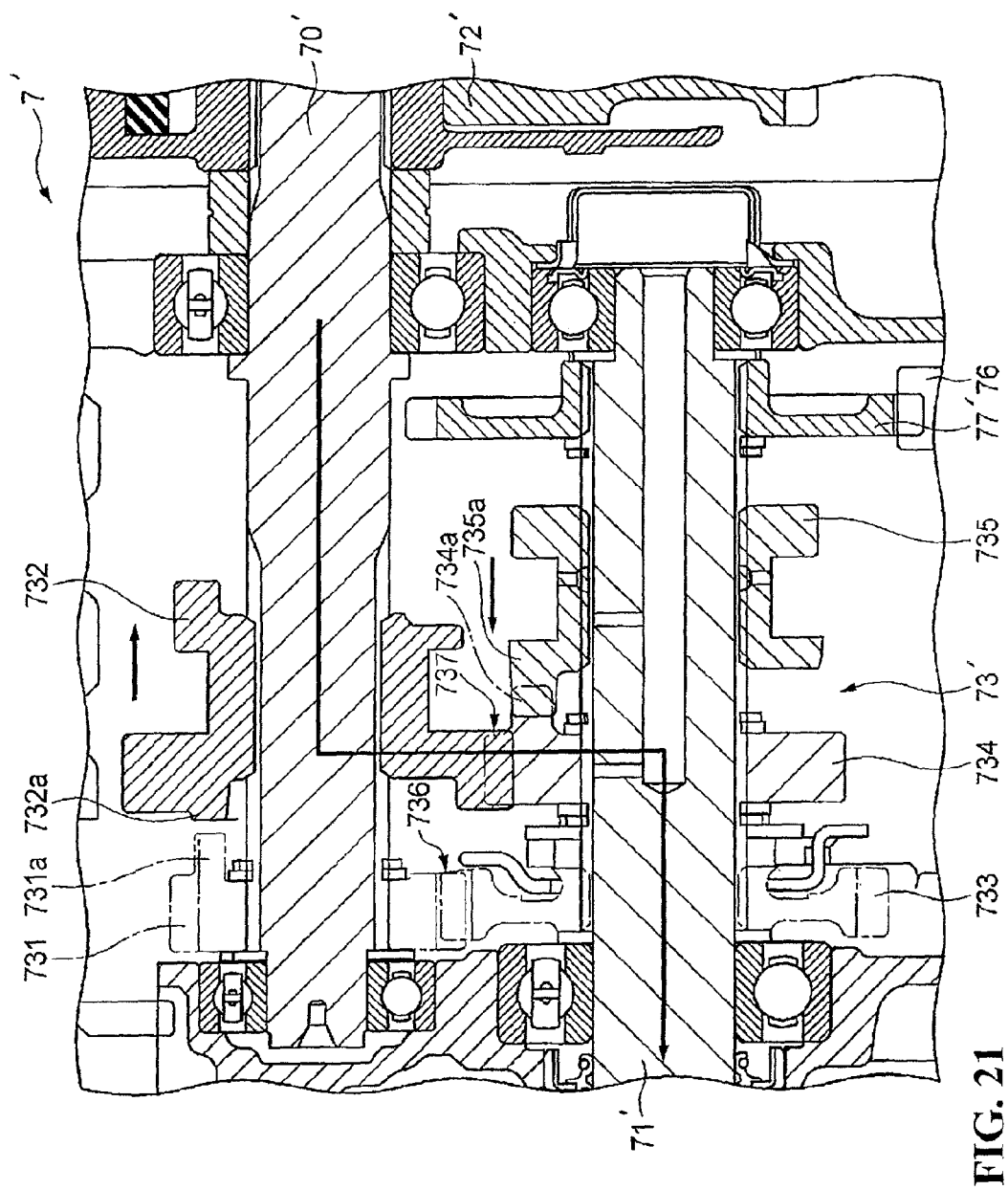
FIG. 21 is a sectional view, with a drive mode selected, of the variable speed portion of the power unit.

When the occupant swings the shift pedal to one side to select the drive mode from neutral, the shifter 735 slides to the high-speed driven gear 734 to engage an engagement portion 734*a* formed on the high-speed driven gear 734 and an engagement portion 735*a* formed on the shifter 735 with each other, as shown in FIG. 21. Thus, as shown by arrows in the drawing, power input into the main shaft 70' is transmitted from the high-speed drive-shifter gear 732 to the drive sprocket 74' of the countershaft 71' through the high-speed gear pair 737 and the shifter 735. On the other hand, when the occupant swings the shift pedal to the other side to shift back into neutral, the shifter 735 is returned to the neutral position to release the engagement between the engagement portion 734*a* and the engagement portion 735*a*.

Figure 22:
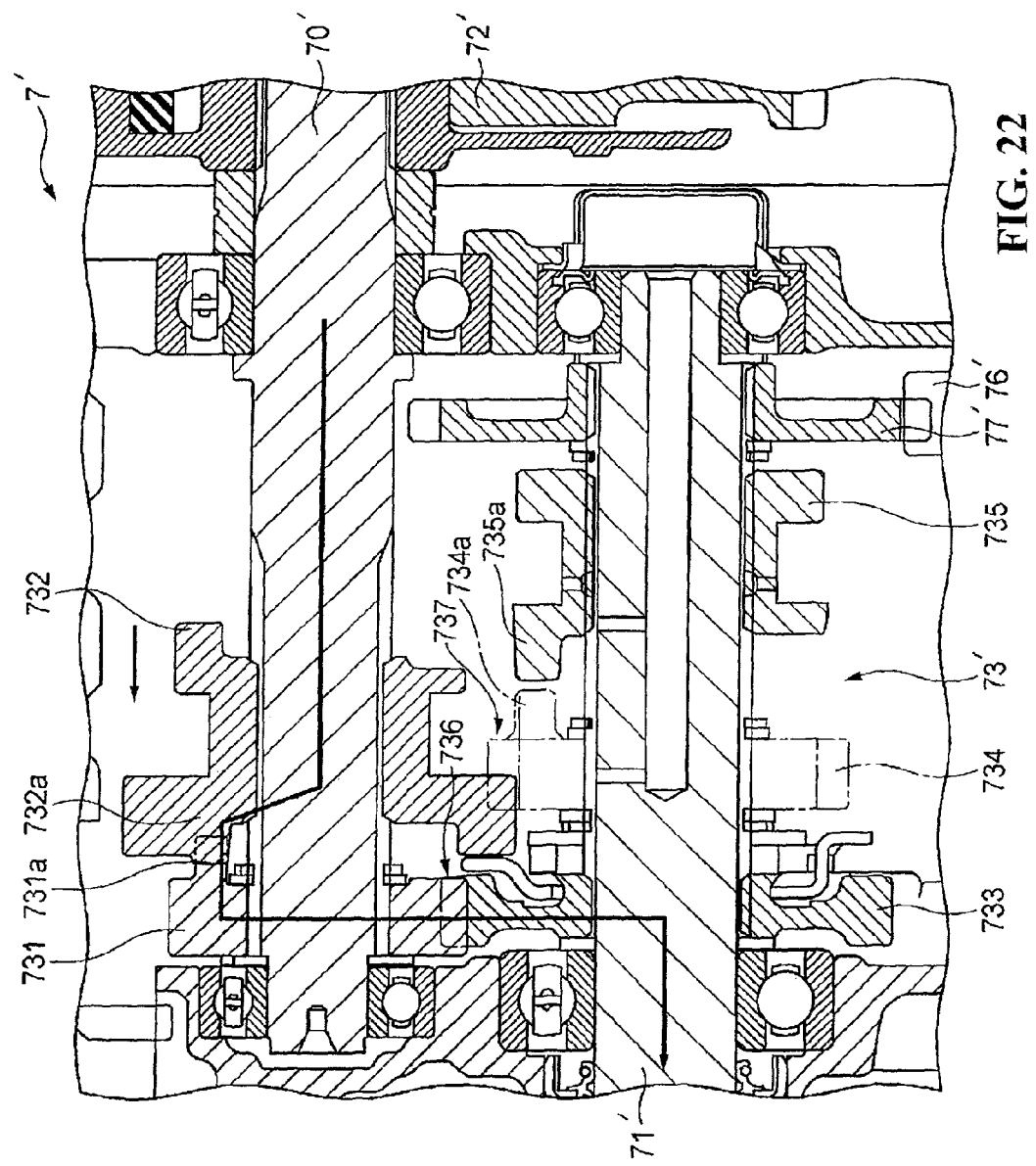
FIG. 22 is a sectional view, with a low-speed mode selected, of the variable speed portion of the power unit.

Meanwhile, when the occupant swings the shift pedal further to one side to select the low-speed mode from the drive mode, the shifter 735 is returned to the neutral position to release the engagement between the engagement portion 734*a* and the engagement portion 735*a*, and the high-speed drive-shifter gear 732 slides to the low-speed drive gear 731 to engage an engagement portion 731*a* formed on the low-speed drive gear 731 and an engagement portion 732*a* formed on the high-speed drive-shifter gear 732 with each other, as shown in FIG. 22. Thus, power input into the main shaft 70' is transmitted to the drive sprocket 74' of the countershaft 71 through the high-speed drive-shifter gear 732 and the low-speed gear pair 736. Also, when the occupant swings the shift pedal to one side or to the other side to select the drive mode from the low-speed mode or to shift back into neutral, the vehicle is put into the drive mode or neutral as described above.

According to the power unit P for the hybrid vehicle constructed in this manner, the motorcycle 1' can travel by transmitting power through the following two transmission paths, a first transmission path and a second transmission path.

The first transmission path is a transmission path for a so-called engine running, in which power of the engine 5' is transmitted to the rear wheel WR through the crankshaft 50', the double centrifugal clutch 8, the outer circumferential shaft 46', the one-way clutch 47', the driven gear 59' (the primary drive gear 58'), the primary driven gear 72', and the power transmission mechanism 7'. In the first transmission path, two-speed change can be performed by the double centrifugal clutch 8' and the variable speed portion 73' of the power transmission mechanism 7'. Also, during running while transmitting power through the first transmission path, assist running can be carried out by driving the motor 6' or alternatively, regenerative charge may be performed by using the motor 6' as a load.

The second transmission path is a transmission path for a so-called EV running, in which power of the motor 6' is transmitted to the rear wheel WR through the motor output shaft 61', the motor drive gear 62', the driven gear 59' (the primary drive gear 58'), the primary driven gear 72', the power transmission mechanism 7', and the drive chain 31'. At this time, as described above, transmission of the power of the motor 6' to the crankshaft 50' is prevented by idling of the one-way clutch 47'. Also, in the second transmission path, two-speed changes can be performed by the variable speed portion 73' of the power transmission mechanism 7'.

Switching between the first transmission path and the second transmission path is automatically performed by the one-way clutch 47'. On the basis of the rotational speed of the driven gear 59' provided on the outer diameter side of the one-way clutch 47' and the rotational speed of the outer circumferential shaft 46' provided on the inner diameter side of the one-way clutch 47', when the rotational speed of the outer circumferential shaft 46' is higher than that of the driven gear 59', the power is transmitted through the first transmission path. On the other hand, when the rotational speed of the driven gear 59' is higher than that of the outer circumferential shaft 46', the power is transmitted through the second transmission path.

In the power unit P constructed in this manner, as shown in FIG. 15, the motor 6 and the double centrifugal clutch 8' are disposed in a one-sided manner in the vehicle width direction with respect to the engine 5', and the vehicle center line O is located between the center of the piston 52' of the engine 5' and the motor 6'.

Figure 24:
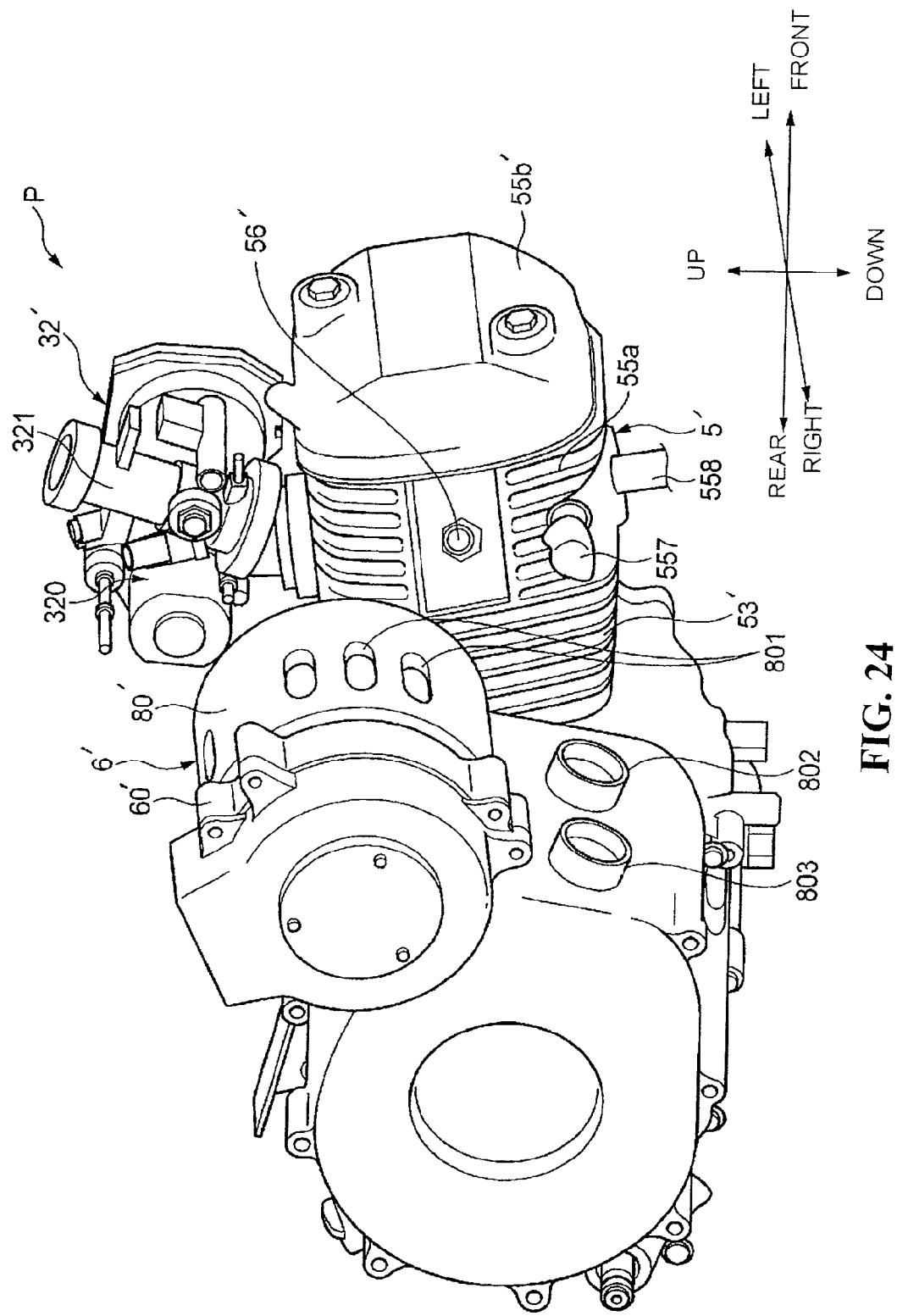
FIG. 24 is an external perspective view of the power unit.
Figure 25:
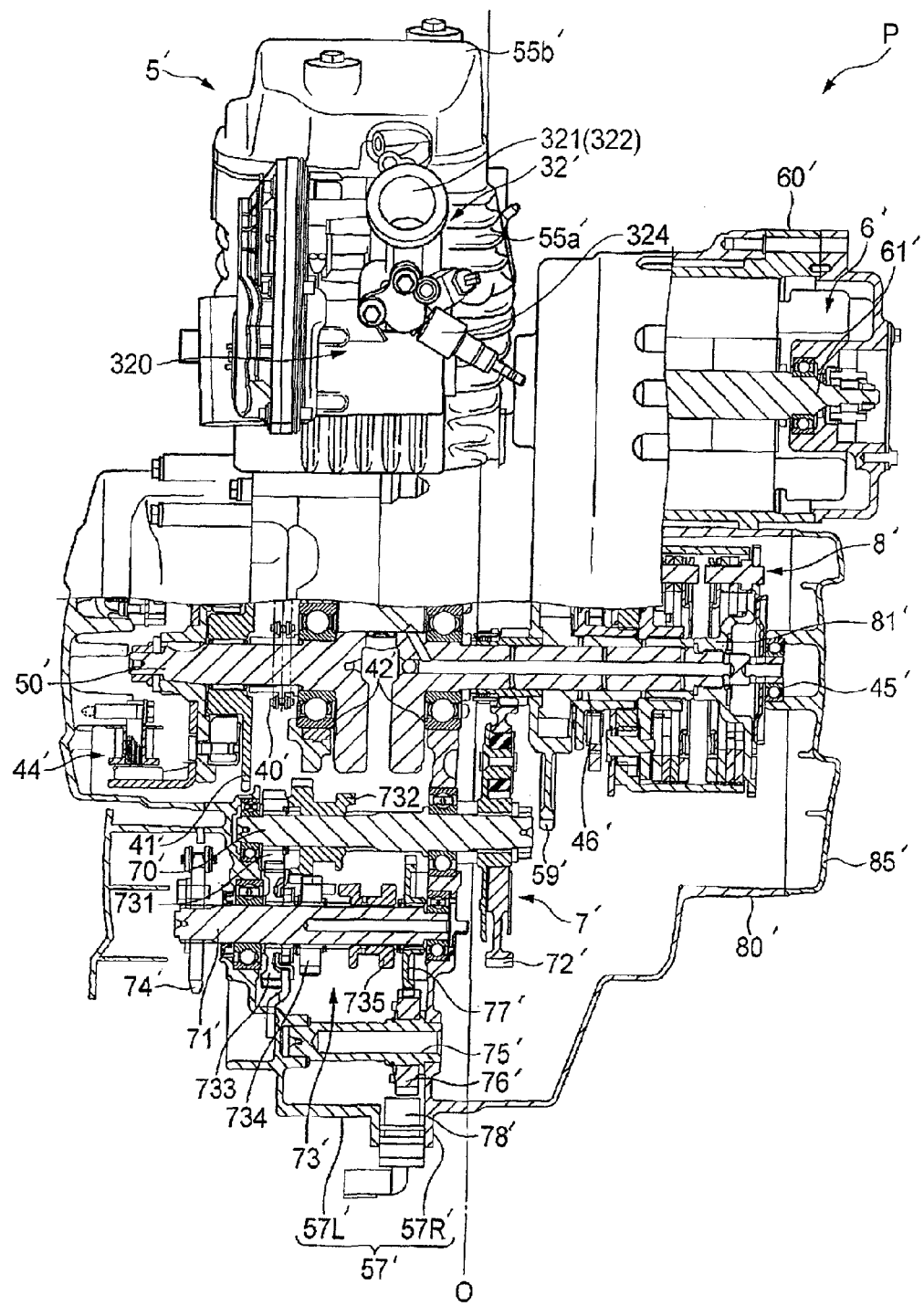
FIG. 25 is a partially sectional view of the power unit, illustrating the positional relationship between a throttle mechanism and a motor.

FIG. 23 is a side view with portions broken away of the power unit. FIG. 24 is a perspective view of the power unit. FIG. 25 is a partially sectional view of the power unit, illustrating the positional relationship between the throttle mechanism and the motor. In FIGS. 23 and 24, arrows show the directions in a state in which the power unit is mounted on the vehicle.

As shown in FIG. 23, the starter motor 33' is disposed above the crankcase 57' and in an overlapping manner with the motor 6' in a side view, and the throttle mechanism 32' is disposed above the cylinder 54 and in an overlapping manner with the motor 6' in a side view. Also, the motor 6' is disposed rearwardly of the intake passage 322 between the cylinder 54' and the main frame 22'.

As shown in FIG. 24, on the crankcase cover 80' for covering the motor 6', there are provided a plurality of cooling openings 801 evenly spaced apart in a circumferential direction to cool the motor 6' accommodated therein. In FIG. 24, an opening 802 is provided for mounting a sensor for detecting rotational speed of a speed detector 835 (see FIG. 16) of the planetary carriers 834 of the planetary gear mechanism 83'. An opening 803 is provided for mounting a sensor for detecting the rotational speed of a speed detector 815 (see FIG. 16) of the first clutch inner 81' of the double centrifugal clutch 8'. In addition, an oxygen sensor 557 and an exhaust pipe 558 are provided.

Also, in the power unit P, as shown in FIG. 25, the actuator 320 of the throttle mechanism 32' is located opposite to the motor 6 in the width direction with respect to the vehicle center line O.

As described above, according to the hybrid vehicle of this embodiment, the engine 5' is suspended on the vehicle body in a non-swingable manner, with the cylinder 54' extending in a substantially horizontal direction and the crankshaft 50' provided to be oriented in the width direction. Also, the motor 6' is located in front of and above the crankshaft 50' of the engine 5'. This prevents the motor 6' from interfering with the rear wheel WR, and the motor 6' can be disposed in the vicinity of the center of the vehicle body, thereby allowing a reduction of lateral expansion.

Furthermore, on one end of the crankshaft 50' of the engine 5', there is provided the double centrifugal clutch 8' for shifting power from the engine 5' to transmit the shifted power to the power transmission mechanism 7. Thus, power of the engine 5' can be previously shifted by the double centrifugal clutch 8 to be transmitted to the power transmission mechanism 7'.

Also, the motor 6' and the double centrifugal clutch 8' are provided in a one-sided manner in the width direction with respect to the engine 5', thereby allowing effective utilization of a space lateral to the engine 5'.

Moreover, the motor 6' is disposed lateral to the cylinder block 53' constituting the cylinder 54' and in an overlapping manner with the cylinder block 53' in side view. Therefore, it is possible to reduce the vertical length of the power unit and miniaturize the power unit.

Also, the power transmission mechanism 7' is provided with the variable speed portion 73' for shifting power from the engine 5' and the motor 6' to transmit the shifted power to the rear wheel WR. Thus, power of the engine 5' and the motor 6' can be shifted at a predetermined transmission gear ratio by the variable speed portion 73' and then transmitted to the rear wheel WR.

In addition, power of the engine 5' is input, by the double centrifugal clutch 8', into the primary drive gear 58' provided on the crankshaft 50' through the one-way clutch 47' to be transmitted from the primary drive gear 58' to the power transmission mechanism 7', thereby allowing travel of the vehicle using the power of the engine 5'.

Moreover, the primary drive gear 58' is provided with the driven gear 59' to engage with the motor drive gear 62' of the motor 6'. Also, power from the motor 6' is input into the driven gear 59' to be transmitted from the primary drive gear 58' to the power transmission mechanism 7', thereby allowing travel of the vehicle using power of the motor 6'. In addition, by disengaging the one-way clutch 47', transmission of power of the motor 6' to the crankshaft 50' is prevented. Therefore, co-rotation of the engine 5' during the EV running is prevented, so that fuel economy can be increased.

Furthermore, the driven gear 59' and the motor case 60' overlap with each other in a side view. With this structure, power of the motor 6' can also be decelerated by engagement between the motor drive gear 62' and the driven gear 59' of the motor 6'.

Also, the starter motor 33' is disposed above the crankcase 57' and in an overlapping manner with the motor 6' in side view, thereby allowing miniaturization of the power unit P.

Moreover, the throttle mechanism 32' using the throttle-by-wire system for operating the engine 5' is disposed above the cylinder 54' and in an overlapping manner with the motor 6' in side view, thereby allowing miniaturization of the power unit P.

Also, the actuator 320 of the throttle mechanism 32' is located opposite to the motor 6' in the width direction with respect to the vehicle center line O. Therefore, the expansion of the actuator 320 allows preventing interference with the motor 6'.

In addition, the vehicle center line O is located between the center of the piston 52' of the engine 5' and the motor 6', thereby allowing a reduction with respect to the lateral expansion.

Also, the cooling openings 801 are provided on the crankcase cover 80 for covering the motor case 60', thereby suppressing heat generation of the motor 6.

In addition, the motor 6' is disposed rearwardly of the intake passage 322, between the cylinder 54' and the main frame 22', thereby allowing miniaturization of the power unit. P.

It should be understood that the present invention is not limited to the above-described embodiment, and various changes, modifications or the like can be appropriately made.

Figure 26:
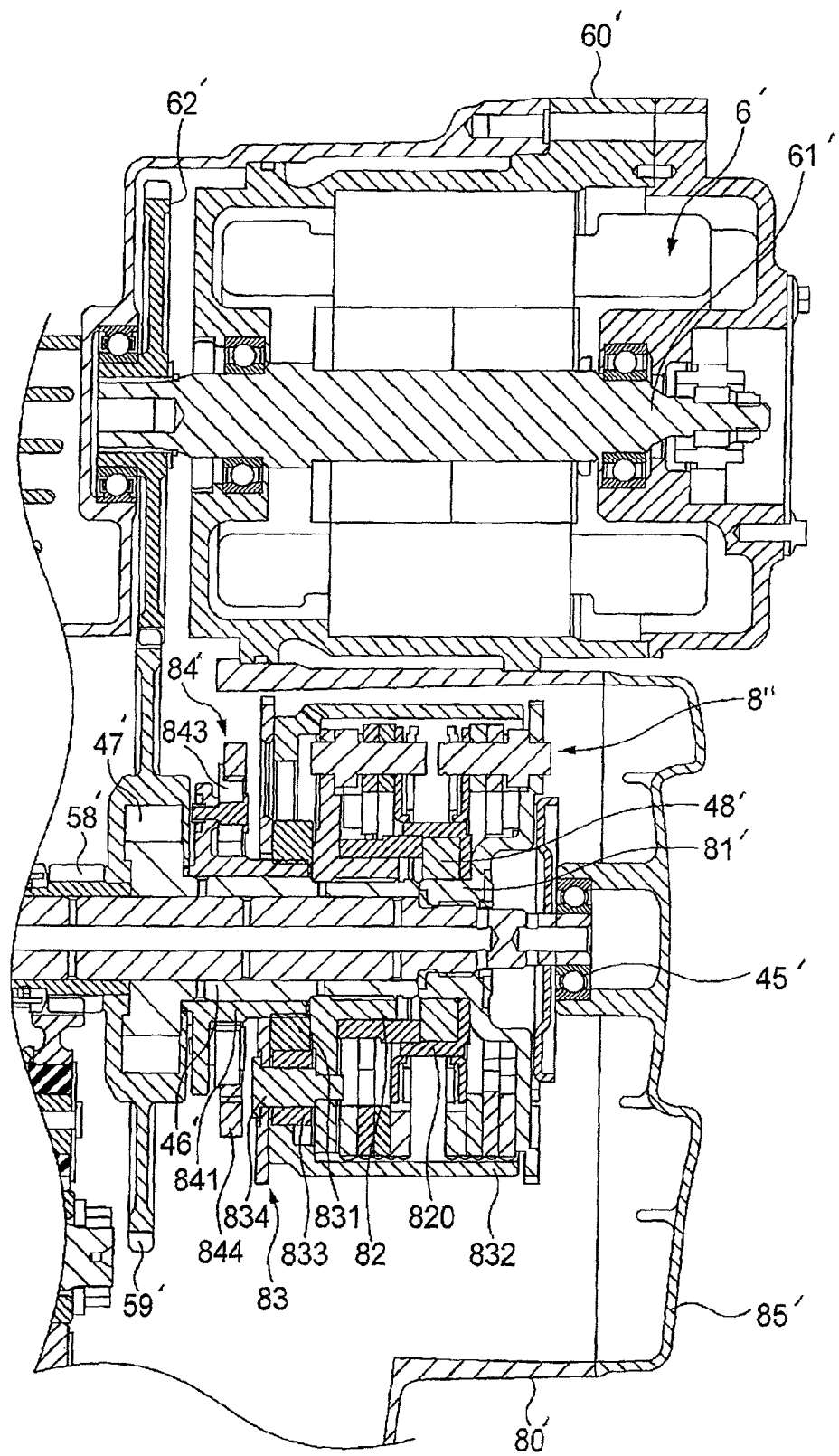
FIG. 26 is a sectional view of a modification of the variable speed mechanism.

FIG. 26 is a sectional view of a modification of the double centrifugal clutch serving as the variable speed mechanism. According to a double centrifugal clutch 8' of this modification, the first clutch inner 81' and the second clutch inner 82' are connected through a one-way clutch 48'. The one-way clutch 48' is provided between a coupling member 820 attached to the second clutch inner 82' and the first clutch inner 81', and is set to prevent the second clutch inner 82' from rotating clockwise with respect to the first clutch inner 81 and allow the second clutch inner 82' to rotate counterclockwise. Thus, at the time of the engine running, the second clutch inner 82' is prevented from rotating at a higher speed than the first clutch inner 81'. In other words, the second clutch inner 82' rotates counterclockwise with respect to the first clutch inner 81' and is prevented from rotating clockwise. Therefore, the one-way clutch 48' does not work.

On the other hand, at the time of the motor running, the driven gear 59' is connected to the outer circumferential shaft 46' through the one-way clutch 47', thereby preventing the power of the driven gear 59' from being transmitted to the outer circumferential shaft 46'. However, in some circumstances, the one-way clutch 47' may follow the rotation of the driven gear 59'. If this is the case, according to the double centrifugal clutch 8" of the foregoing embodiment, the sun gear 831 rotates clockwise through the planetary carriers 834 with the rotation of the outer circumferential shaft 46'. When the sun gear 831 rotates clockwise, the ratchet supporting member 841 rotates clockwise and the ratchets 843 do not engage with the grooves 845 of the ratchet receiving portion 844, resulting in idling of the ratchet supporting member 841. At this time, the ratchets 843 make rotational noises.

According to this modification, at the time of the motor running, the first clutch inner 81' is in a non-operational state, which leads to clockwise rotation of the second clutch inner 82' with respect to the first clutch inner 81'. Therefore, the one-way clutch 48' prevents the rotation of the second clutch inner 82', thereby reliably preventing the rotational noises of the ratchets 843 during the motor running and allowing minimization of energy losses caused by co-rotation of the outer circumferential shaft 46'.

Figure 27:
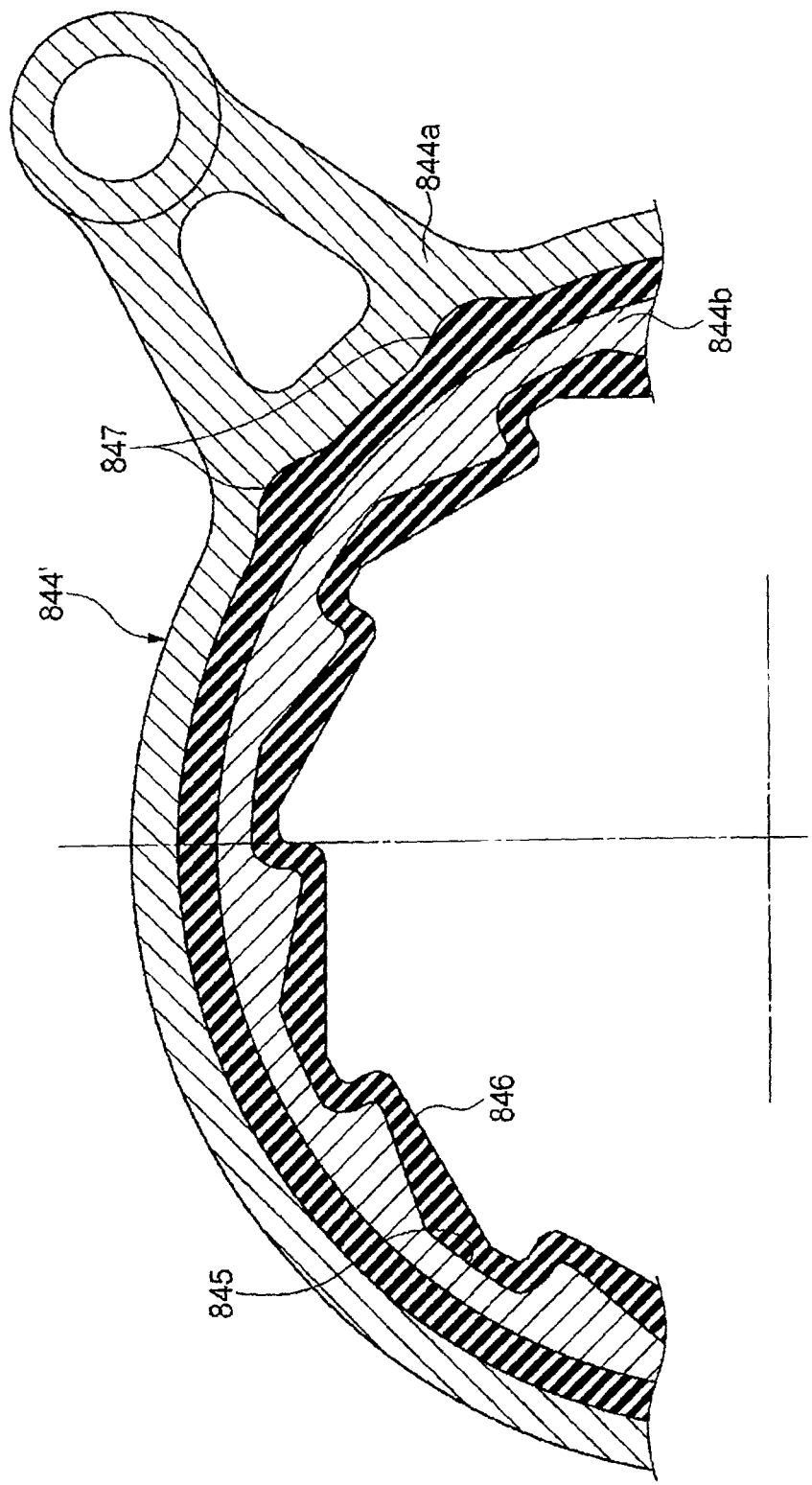
FIG. 27 is a sectional view of a modification of a ratchet receiving portion.

FIG. 27 is a sectional view of a modification of the ratchet receiving portion. A ratchet receiving portion 844' of this modification is constructed in such a manner that a second ratchet plate 844b provided with the grooves 845 on an inner peripheral surface thereof, leaving a predetermined space therebetween, is disposed on the inner periphery of a first ratchet plate 844a and the vibration-proof rubbers 846 are molded so as to cover over the second ratchet plate 844b. The rotation of the first ratchet plate 844a relative to the vibration-proof rubbers 846 is prevented by recesses 847 provided on the first ratchet plate 844a. In this manner, since the inner peripheral surface of the second ratchet plate 844b including the grooves 845 is entirely covered with the vibration-proof rubbers 846, the rotational noises of the ratchets 843 can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle, in which a vehicle body frame is provided with a crankshaft, a primary gear integrated with the crankshaft, a primary driven gear engaged with the primary gear, a clutch mechanism coupled with the primary driven gear that connects/disconnects power of an engine, and a transmission provided on the output side of the clutch mechanism, and to which the engine that transmits the power to a drive shaft via the transmission is attached comprising:
   a one-way clutch for transmits the power from the crankshaft to the primary gear and for not transmitting the power from the primary gear to the crankshaft, said one-way clutch being provided between the crankshaft and the primary gear;
   a regenerative brake motor for enabling braking of a wheel and enabling conversion of torque of the wheel to electric energy, said regenerative brake motor being provided between the primary gear and a drive shaft of the wheel; and
   a controller for causing the regenerative brake motor to generate electric energy when a revolution speed of the primary gear is high in a revolution ratio between the crankshaft and the primary gear, while causing the regenerative brake motor to run idle when a revolution speed of the crankshaft is equal to or higher than the revolution ratio of the revolution speed of the primary gear.

2. The vehicle according to claim 1, wherein the crankshaft is provided with a power transmission mechanism for driving an oil pump upstream of the one-way clutch.

3. The vehicle according to claim 2, wherein the regenerative brake motor is provided so as to be engaged with the primary gear.

4. The vehicle according to claim 2, wherein the regenerative brake motor is coupled with the wheel.

5. The vehicle according to claim 2, wherein a connection/disconnection mechanism for disconnection when a throttle valve is opened and for connection when the throttle valve is closed is provided between the primary gear and the regenerative brake motor.

6. The vehicle according to claim 2, wherein a rotor of the regenerative brake motor is provided coaxially with the primary gear and the one-way clutch.

7. The vehicle according to claim 2, comprising a throttle wire actuator unit for opening/closing the throttle.

8. The vehicle according to claim 1, wherein the regenerative brake motor is provided so as to be engaged with the primary gear.

9. The vehicle according to claim 8, wherein a connection/disconnection mechanism for disconnection when a throttle valve is opened and for connection when the throttle valve is closed is provided between the primary gear and the regenerative brake motor.

10. The vehicle according to claim 8, wherein a rotor of the regenerative brake motor is provided coaxially with the primary gear and the one-way clutch.

11. The vehicle according to claim 8, comprising a throttle wire actuator unit for opening/closing the throttle.

12. The vehicle according to claim 1, wherein the regenerative brake motor is coupled with the wheel.

13. The vehicle according to claim 1, wherein a connection/disconnection mechanism for disconnection when a throttle valve is opened and for connection when the throttle valve is closed is provided between the primary gear and the regenerative brake motor.

14. The vehicle according to claim 1, wherein a rotor of the regenerative brake motor is provided coaxially with the primary gear and the one-way clutch.

15. The vehicle according to claim 1, comprising a throttle wire actuator unit for opening/closing the throttle.

16. The vehicle according to claim 1 and further comprising:
   an electric motor; and
   a power transmission mechanism for transmitting power of the internal combustion engine and the electric motor to a driven portion;
   wherein the engine is suspended on a vehicle body in a non-swingable manner, with a cylinder extending in a substantially horizontal direction and a crankshaft provided to be oriented in a vehicle width direction; and
   the electric motor is located in front of and above the crankshaft of the internal combustion engine.

17. The vehicle according to claim 16, wherein, on one end of the crankshaft of the engine, there is provided a variable speed mechanism for shifting power from the engine to transmit the shifted power to the power transmission mechanism.

\* \* \* \* \*